(12) United States Patent
Weber

(10) Patent No.: US 7,057,673 B1
(45) Date of Patent: Jun. 6, 2006

(54) TELEVISION REMOTE CONTROLLER UTILIZING A PROGRAM PROVIDER'S ACRONYM TO SELECT A CHANNEL NUMBER

(75) Inventor: Harold J. Weber, West Hyannisport, MA (US)

(73) Assignee: Savvy Stuff Property Trust, Centerville, MA (US)

( * ) Notice: Subject to any disclaimer, the term of this patent is extended or adjusted under 35 U.S.C. 154(b) by 836 days.

(21) Appl. No.: 10/011,562

(22) Filed: Dec. 11, 2001

(51) Int. Cl.
*H04N 5/44* (2006.01)

(52) U.S. Cl. .................. 348/734; 348/731; 455/151.1; 725/57

(58) Field of Classification Search ............... 348/734, 348/731, 732, 733, 570, 14.05; 340/825.72, 340/825.69, 825.22; 455/151.4, 151.1, 151.2, 455/186.1; 725/38, 57
See application file for complete search history.

(56) References Cited

U.S. PATENT DOCUMENTS

| | | | | | |
|---|---|---|---|---|---|
| 4,914,517 | A | * | 4/1990 | Duffield | 725/57 |
| 5,045,947 | A | * | 9/1991 | Beery | 725/57 |
| 5,068,734 | A | * | 11/1991 | Beery | 348/570 |
| 5,673,089 | A | * | 9/1997 | Yuen et al. | 725/38 |
| 5,883,680 | A | * | 3/1999 | Nykerk | 348/734 |
| 5,963,269 | A | * | 10/1999 | Beery | 348/570 |
| 6,072,535 | A | * | 6/2000 | Kearns | 348/563 |
| 6,094,239 | A | | 7/2000 | Weber | 348/734 |
| 6,215,531 | B1 | * | 4/2001 | Beery | 348/734 |
| 6,532,592 | B1 | * | 3/2003 | Shintani et al. | 725/141 |
| 6,606,050 | B1 | * | 8/2003 | Lin | 341/176 |
| 6,766,526 | B1 | * | 7/2004 | Ellis | 725/57 |
| 6,874,152 | B1 | * | 3/2005 | Vermeire et al. | 719/330 |

OTHER PUBLICATIONS

"TV TIMES™", *The Cape Cod Times Television Magazine* (*Sunday Newspaper Insert*), Jul. 22-28, 2001, pp. 8,47 & 48.
"Jensen[R] User Guide" (*Model SC310, SC320, SC330, SC340 Remote Controls*), Jensen div. Recoton Corp., 2950 Lake Emma Rd., Lake Mary, FL 32746.
U.S. Appl. No. 08/974,668, filed Nov. 19, 1997, Weber.
U.S. Appl. No. 09/614,559, filed Jul. 12, 2000, Weber.
U.S. Appl. No. 09/774,529, filed Feb. 1, 2001, Weber.
U.S. Appl. No. 09/779,992, filed Feb. 12, 2001, Weber.

* cited by examiner

*Primary Examiner*—Brian P. Yenke
*Assistant Examiner*—Jean W. Désir

(57) ABSTRACT

A portable and usually handheld remote controller for accepting manual entry of acronymical as well as decimal input data urged through a keypad and converting the submitted input data into channel number selection data which is sent via wireless command to a channel selection receiver, such as a television set. The remote controller is particularly suited for accepting a program content provider's acronym, such as NBC and converting it, usually through an intermediate decimal entry step represented by keypad equivalent decimal values such as 622 and finally into a variously presetable channel selection decimal value such as 07 which is subsequently sent via the wireless command for effectuating a television channel selection uniquely designated by any particular service provider's virtual or real channel number assignments.

20 Claims, 14 Drawing Sheets

ACRONYM TO INTERMEDIATE COPULA VALUE CONVERSION DATA

| ACRONYM | COPULA VALUE | ACRONYM | COPULA VALUE |
|---------|--------------|---------|--------------|
| ABC | 222 | HBO | 426 |
| CBS | 227 | HBO2 | 4262 |
| FOX | 369 | HGTV | 4488 |
| NBC | 622 | HIST | 4478 |
| PBS | 727 | IFC | 432 |
| AE | 23 | LIFE | 5433 |
| AMC | 263 | MAX | 629 |
| ANPL | 2675 | METRO | 63876 |
| BBCA | 2222 | MSNBC | 67622 |
| BET | 238 | MTV | 688 |
| BRV | 278 | NICK | 6425 |
| CNBC | 2622 | SCIF | 72434 |
| CNN | 266 | SHO | 746 |
| COURT | 26878 | STAR | 7827 |
| CSPAN | 27726 | TBS | 827 |
| DIS | 347 | TCM | 826 |
| DSC | 372 | TLC | 852 |
| ENC | 362 | TMC | 862 |
| ESPN | 3776 | TNN | 866 |
| ESPN2 | 37762 | TNT | 868 |
| FAM | 326 | TOON | 8666 |
| FOOD | 3663 | USA | 872 |
| FX | 39 | VH1 | 841 |
| GALA | 4252 | WE | 93 |

FIG. 3    88

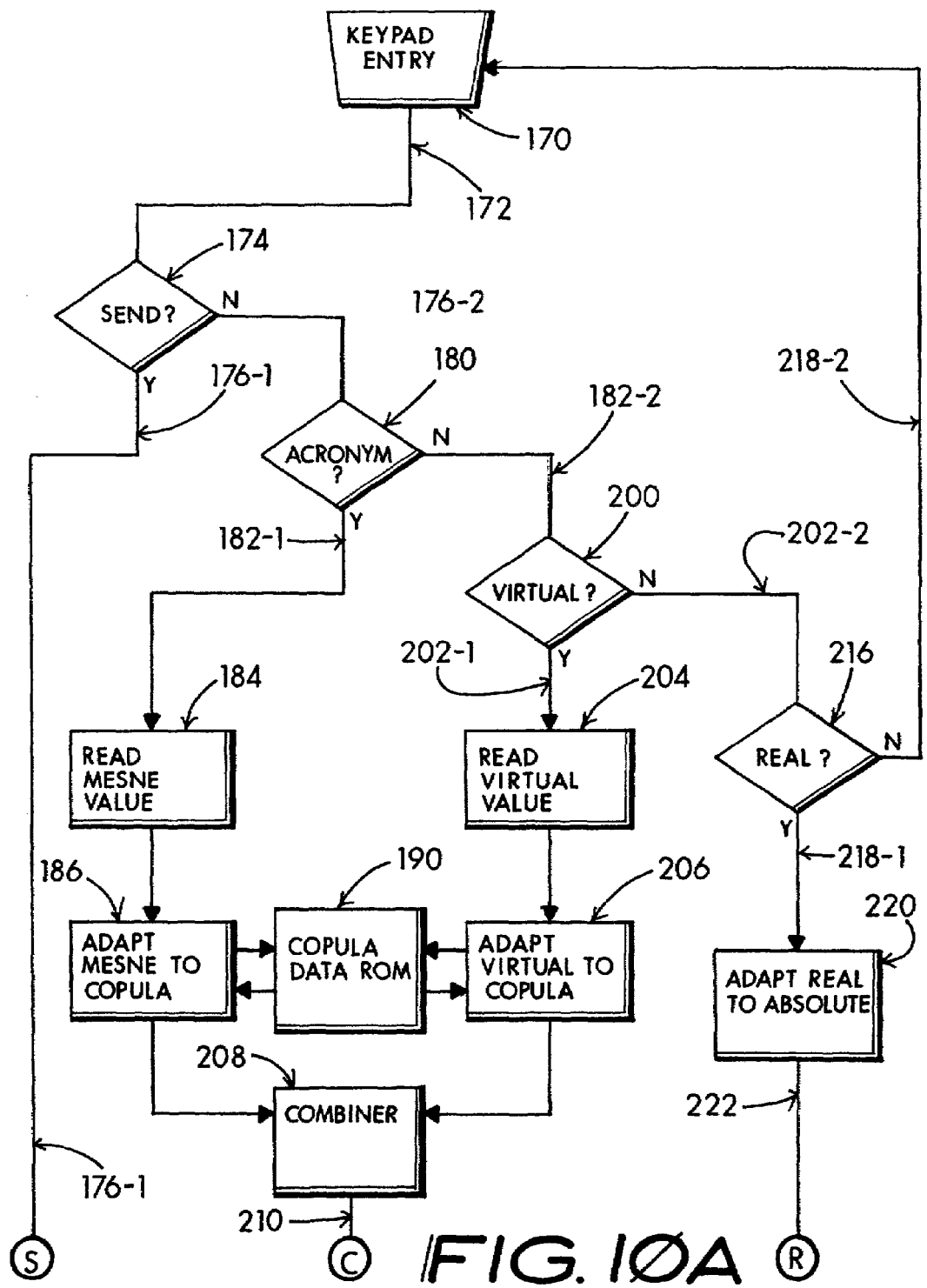

TELEVISION REMOTE CONTROLLER UTILIZING A PROGRAM PROVIDER'S ACRONYM TO SELECT A CHANNEL NUMBER

FIELD OF MY INVENTION

My invention pertains to the general field of portable remote controllers and in particular to a class of hand-held wireless remote controllers commonly used to change tuning and function controls associated with entertainment equipment. My invention more particularly relates to the remote control of television channel selection on any of a variety of remotely controlled devices, including a televisor, cable-box converter, satellite receiver, VCR-machine, DVD-machine and similar apparatus. Most particularly it relates a capability for urging channel changes in a television receiver's program selection through a manual entry of the program provider's acronym, such as: HBO for Home Box Office and CBS for Columbia Broadcasting System or a stations call letters such as WPRI instead of real or virtual channel numbers.

BACKGROUND OF MY INVENTION

Commercial television program content and other entertainment information is commonly distributed by coaxial or fiberoptical "cables" to residential customers. Cable programming signals are ordinarily run through a "cable box" or cable converter (viz, "set-top box") which provides the "channel selection" capability, usually outputting the selected program signal on a lower channel such as channel 3 or else channel 4. Alternatively, the set-top box may deliver audio and video signals directly to "A/V Input" or "S-Video" input connections provided on a majority of contemporary TV-sets and monitors. Incoming cable program signals may also be inputted directly into a category of "cable ready" television sets (TV-sets) and similar equipment, albeit without benefit of the usual cable box amenities such as a capability for receiving and descrambling premium programs, pay-per-view movies, etc.

Numerous satellite systems also provide microwave wireless signals that may be picked up by an individual receiving dish antenna hooked to a customer's television set through an intermediate "satellite receiver". Satellite television program distribution, such as DirecTV™ or EchoStar™ is widely used in less-densely populated areas and elsewhere it is directly competitive with the cable distribution systems. Satellite services may also offer "over-the-air" originated "local" or regional channel programming which was originally broadcast on a Federal Communications Commission (FCC) assigned "over-the-air" channel, typically including the network affiliated stations of ABC, CBS, FOX, NBC and PBS.

Commercial and public television programs are also directly broadcast "over-the-air" in most regions of nearly all industrialized nations. In the United States, for example, several commonly broadcast commercial networks include ABC, CBS, NBC and FOX as well as public PBS television stations. A particular program may be broadcast throughout the United States on the same network, for example "The Tonight Show" appears nightly on NBC while "Nightline" appears regularly on ABC. The NBC show is broadcast on many different channels in different cities: for example, NBC is WHDH Channel 7 in Boston, Mass. whilst it separately albeit concurrently broadcast as WJAR Channel 10 in Providence, R.I. and as WNBC in metropolitan New York City on Channel 4. Similarly, ABC programming appears as WCVB Channel 5 in Boston, Mass.; as WLNE Channel 6 in Providence, R.I. and as WABC Channel 7 in the New York city area. In other words, knowing the local channel number gives no clue as to the network and conversely, knowing the network acronym gives no clue as to the local channel number.

Remotely Controlled Channel Selection

Remote control of televisors and similar equipment is ordinarily obtained through the use of a portable and usually hand-held remote controller. Popular usage of remote controls for TV channel selection is a relatively recent phenomenon, having been first introduced in the 1950s by then Zenith Radio Corp. under the name Space Command™ but not having achieved widespread acceptance until the early 1980s.

Prior Art Offerings

Two principal types of remote controllers are currently popular. One is a dedicated "OEM" original equipment remote, generally supplied by the maker of a television set, cable box, VCR-machine or similar device. A typical OEM remote controller is exclusively programmed to work solely with a unique encoding scheme characteristic of a particular maker's equipment.

A second type of controller is an intentionally more versatile "universal remote". Universal remotes are commonly sold as an after-market item and ordinarily capable of being re-programmed, e.g. "set-up", by the user to select between and work with the various encoding schemes (command encryption patterns) unique to any of several different makes, models and types of entertainment devices. Most commonly, the universal class of remote controller is designed to select between and operate a "TV" set, a "VCR" machine and a "CBL" (cable box) set-top converter. Sometimes this provision includes a "SAT" (satellite receiver), a "DVD" (digital video disc) machine selection or an "audio receiver".

Additional variations include a combination where the remote control encoding is supplied to be initially pre-programmed for a particular OEM's products, e.g., TV-set, VCR-machine, etc., but where the pre-programming may be readily overridden to adapt one or more selected device functions to cooperate with another maker's equipment.

More generally, remote controllers subject to this invention's novel teachings may generically include any category of electronic signal receptor using "channel numbers" for tuning determination. For one recent example, home theater systems may include a "television video receiver" separate from the display and sound portions of the equipment combination. Such a "component" receiver benefits from this invention's teachings just as surely as a conventional television set.

Several makers dominate the aftermarket business, most notably including Universal Electronics, Inc.; Thompson Electronics; Philips, Sanyo Corp. and Recoton Corp. Some of these and other makers furthermore market themselves under a variety of "private labels", including Archer, Jensen, RCA, Sanyo, Zenith, Radio Shack, Magnavox, GE, Sony and so forth. Additionally, there is a burgeoning plethora of "far East" and other off-shore makers who manufacture, import and sell "universal" remote controls of all types, including "learning" remotes and field-reprogrammable remotes in many clever configurations. More notably is the finding that a majority of remote controllers sold in the American marketplace are, in fact imported from off-shore sources.

As a result the various maker's conceptual similarity, a widespread tendency prevails for a maker to "knock-off" or copy another maker's remote-controller's technical and functional design. The casual user (e.g., the end-market consumer) quickly finds that as a result of this cribbed emulation, the operational characteristics and resulting performance of most common replacement universal type remote controls is about the same and similarly limited. It is well known or quickly realized through experience that "most" remote controllers "work alike" although a great diversity in their functional details may include numbers of equipment support functions serviced, cosmetic appearance and similar details. For the most part, these mere variations in button placement and labeling tend to make convenience of operation more difficult for the neophyte user of a new piece of equipment, or a different brand or even a different model of remote controller.

Contemporaneous remote controllers may include a "memory" which is ordinarily provided to allow a user to quickly return to frequently visited channels, to jump-back to a last-visited channel or merely automatically tune a favorite channel. A multi-device remote control having memory provision and including cosmetic diversity is typified by a "Millennium™ 4" (model URC-4M made by Universal Electronics Inc., Cypress, Calif. 90630) and a similar Philips-Magnavox "Universal Remote" (model REM250, Clifton, N.J. 07014-1115) either of which is intended to work with four distinctly different remotely controlled devices: a TV-set, cable box, VCR-machine and an auxiliary device.

Another remote controller variation is a Sanyo™ model RMT-U100 which is intended to guide the operation of three devices: a TV-set, cable box and VCR-machine. Yet another more elaborate remote controller made by Universal Electronics, Inc. is represented as a "state-of-the-art remote" and promoted as the "Catalyst™ 48" model URC-4800 series that may enable a user to remotely control up to eight dissimilar devices, such as a TV-set, VCR-machine, cable box, satellite receiver, CD-player, video camera and home theater equipment such as amplifiers, tuners and other auxiliary equipment. A common thread limiting every one of these prior art remote controls, until now, is the necessity for the user to absolutely know the correct channel number for any program provider's service which the user wishes to visit. For example, if Home Box Office (HBO) is showing a movie the user must know the channel number which HBO is available on, for example "channel 60" is valid in at least one AT&T-Broadband™ service area. Without advance knowledge of the correct channel number, the viewer has no "quick and simple" way of gaining HBO access aside from happen-chance surfing through dozens if not hundreds of available channels.

Program Provider Acronym and Channel Number

For purpose of this immediate discussion a program provider's acronym is generally the initials of a program network or service, such as ABC for American Broadcasting Company, NBC for National Broadcasting Company; TLC for The Learning Channel; and CNN for Cable Network News. In the ordinary usage of the cable box or TV-set, a viewer in a particular Eastern Massachusetts region serviced by AT&T-Broadband™ ordinarily tunes to channel 5 for ABC, channel 38 for TLC and channel 42 for CNN. Obviously this assumes (or requires) that the viewer "knows" CNN is channel 42, for example.

To find what acronymic provider matches with a channel number, viewers ordinarily must resort to various conversion charts, newspaper listings and publications such as the TV-Guide™ magazine. These are complicated, time-wasting and expensive solutions, considering that TV-Guide™ magazine presently costs about two dollars a week.

Conversion charts may be (and usually are) provided by cable companies as a supplement to their service. These charts and other publications such as newspaper inserts are confusingly difficult to read. Furthermore, the listings often given in widely distributed publications (such as newspaper inserts, TV-Guide™ magazine, etc.) are generalized to service a wide area and therefore may merely show the provider's acronym such as "HBO", but not necessarily the local TV station channel number which may be "channel 60" in one area and "channel something else" in another even nearby area. It is well known that aside from HBO, many other cable-exclusive programs such as provided by the DiSney channel, the HISTory channel and others have unique or virtual channel numbers assigned differently in different areas by their cable system providers, such as AT&T Broadband™, Adelphia™, Cablevision™, MediaOne™, TimeWarner™, TCI™ and so forth. For example, in the metropolitan New York City area there are about 27 different cable purveyors, each with their own proprietary arrangement of channel assignments.

Confusing Usage of Network Acronyms

A common thread running through these various cable and satellite based signal distribution system configurations is finding that a network acronym may be related to a real channel numbers assigned to an "over the air" TV-station by the FCC, or a virtual channel number which may be uniquely assigned by a cable system or satellite service provider in any particular region. As a result of these inconsistencies in channel numbering, a residential customer may be seeking a network program (such as originated by a FOX Network affiliate television station) and resorts to a guide listing to find that the FOX Network program is broadcast over-the-air on channel 25 in his area (for example, Boston, Mass. area). However, the viewer soon realizes that merely tuning his set-top box to channel 25 on the mentioned AT&T-Broadband™ cable system may deliver a completely unexpected network, such as "Nickelodeon™" programming, and not the desired FOX network program. This occurs because cable systems, such as AT&T-Broadband™, and most others, routinely shift many over-the-air channel numbers to another virtual channel numbers. In this example of the FOX Network broadcast on channel 25 the provider has shifted it to the provider's virtual channel 13 at the viewer's TV-set location. As a result, an absolute channel command of 13 must be submitted to the TV-set's tuner.

It is soon realized that the only constant is the FOX network acronym. The acronym's meaning remains the same throughout the nation. A particularly high-profile example of this kind of channel assignment confusion surrounded an Aug. 26, 2001 "Madonna Concert" which was widely promoted as being viewable on Time-Warner Entertainment's Home Box Office (HBO) network. HBO is not an over-the-air program provider. It is exclusively delivered by satellite connection to each regional HBO cable service provider, such as AT&T-Broadband™ or Adelphia™ for localized distribution. As a result, each individual region or area of the nation experiences a diverse number of different channel number associated with the HBO channel scheduled for carrying the concert. An expensive promotion was done nationwide in the context of viewing it on HBO, since the promoters realize that the HBO acronym is of universal meaning while channel numbers are locally specific. This is most specifically illustrated by a publication "HBO GUIDE", which for October 2001 promoted Tom Hanks and Steven Spielberg's miniseries "Band of Brothers" using only the acronym HBO. Acronymical promotion is presently found on the network's promotional internet website http://www.hbo.com on a regular basis.

Tuning to the proper channel known to carry HBO programming in any specific area has traditionally been left up to the ingenuity of the viewer. The viewer had to find which channel locally carried the HBO program content, as for example Channel 60 in a particular AT&T-Broadband™ service area and Channel 28 in an nearby Adelphia™ service area. Usually this required resorting to a local channel conversion chart, or else a listing in a local newspaper or other source.

Acronym Entry Reduces Confusion

This invention offers to alleviate confusion by rendering a virtual or a real channel number selection solely based upon direct acronym entry into the remote controller's keypad. The entered acronym is processed and delivers a corresponding channel number command to the remotely controlled televisor.

When an over-the-air channel number or a local cable channel number is known, it makes common sense to use it as the channel selection entry. On the other hand, when only the network's name or acronym is known (such as "HBO", or "NBC"), the acronym alone may be used to automatically establish channel selection.

Quick Convenience in Changing Programs

Prior to this invention, a viewer traditionally must "look up" the exampled HBO or NBC listing in a local television channel guide and correlate the acronymical listing with whatever channel it is delivered on in the viewer's regional area. This is a major time-consuming nuisance and a drawback with network "logo" promotions. Sometimes the delay in looking up the corresponding channel number causes the viewer to miss an all-important opening sequence or happening typical of a dramatic program or sports event.

Submit Acronym Through a Shared Keypad

Taking a program content provider's or a network's popular logo or acronym, such as HBO, NBC, CNN, etc. and urging the acronym into an alpha-numerical keypad arrangement is a fundamental offering of my novel remote controller invention. The keypad entries are automatically converted into locally recognizable channel numbers which are sent to a remotely controlled TV-set or cable box as a wireless command to urge changes to appropriate channel number selections corresponding with the acronymical entries.

In a preferred embodiment of the invention, the acronym is entered letter-by-letter into matching decimal keybuttons which are dually assigned alphabetical character values. An example of such assignment is obtained in a keypad layout similar to a common Touchtone™ telephone keypad, where eight of the ten decimal keybuttons have alphabetical parallels. The usual arrangement includes:

| 2,A,B,C; | 3,D,E,F; | 4,G,H,I; | 5,J,K,L; |
|---|---|---|---|
| 6,M,N,O; | 7,P,R,S; | 8,T,U,V; | 9,W,X,Y; | noting that in borrowing assignments from the usual telephone application, the letters Q and Z are missing.

Recognizing this lacking leads to the co-assignment of the 0 or the 1 keybutton to include the Q and Z characters. As a result, the entry of station call letters such as WBZ or network acronyms such as STARZ and QVC become practical. For example, if 0 is co-assigned where it becomes (0,Q,Z) then entry of the acronym results in an equivalent copula value of (STARZ=78270) and (QVC=082).

Following this lead, when the viewer enters HBO for example, the intermediate decimal entry 426 is delivered by the keypad to the controllers processor circuitry. The intermediate value 426 may serve as an address for a lookup table in a memory, where the addressed location may have been preset to the local channel number, such as channel 60 for example. Therefore an absolute channel 60 command is sent to the remotely controlled television receiver.

Flexible Set-Up

A large number of various combinations of acronym and channel number combinations are known to be in use throughout the United States (and elsewhere). Therefore a "one size fits all" approach is impractical, insofar as converting acronym entries into channel number digits is concerned. This teaching shows that any one, or else a combination, of several "presetting" approaches may serve the end-user's need for flexibility and economical usability.

Captive System's Remote Controllers

Cable system operators frequently provide set-top boxes ("cable converters") to their subscribers and these offerings usually include a remote controller. Sometimes a remote controller is made available as an accessory from the cable company for a nominal rental fee. A cable system provider such as AT&T-Broadband™ maintains records of it's network related channel number assignments in any particular service area. It is therefore reasonable for the remote controller provided by the cable system operator to be suitably preprogrammed to provide the necessitous conversion between entry of a three letter acronym such as "CNN" and automatically associating the entry with a channel 42 assignment, for example.

In this practicable form of my invention, the remote controller is particularly encoded to determine and send a preset channel number as a command to the remotely controlled cable box. The commanded channel number corresponds with the user's acronymic entry.

A remote controller used in this environment may readily be pre-programmed by the supplier since the service area assignments of channel numbers as related to network acronyms is defined by the supplier. The conversion data is manageable as non-volatile data stored in a ROM (PROM), or alterable data stored in a "Flash Memory", EEPROM or other normally non-volatile albeit reprogrammable memory provision.

Cable system operators do, on occasion, make changes in a few of their cable number and network associations. Cable system operators also add, delete and otherwise modify the organizational placement of program content providers. Therefore, I expect that an occasional "upgrade" or reprogramming of the memory data is desirable. This upgrade may be managed by modular exchange of the ROM, downloading into a PROM by connection with a computer signal bus, similarly downloaded through a modem from an internet (or provider's) site, or else accomplished by a manual reprogramming which may be occasionally carried out by the user.

Universal "After-Mareket" Remote Controllers

A universal remote controller is, by design intent, provided to be setup by the user to work with any combination of a large variety of different remotely controlled equipments. This reflects that the remote controller can be re-coded by a user to work with nearly any combination of equipment the user might choose to assemble.

Managing acronymical entries may be a manual re-programming of one or more alphabetical acronyms into virtual channel numbers. In other words, the conversional entries may be limited to a few of the most frequently used acronyms, or to as many as might be available. Resetting the acronymical conversion data in the memory may also be obtained by a unique sequence of keypad entries, download from a computer disk or transfer from an internet site.

Original Equipment Remote Controllers

An original equipment (OEM) remote controller typically provided by the maker of a TV-set, cable box or VCR-machine is usually dedicated primarily to the operation of the supplier's equipment brand-line. Some contemporaneous OEM remote controllers do include a universality feature, permitting their reprogramming of at least the secondary functions to work with at least a limited variety of accessory devices. This invention anticipates that when the maker intends, the remote controller may be reprogrammable in a manner similar to that discussed relative with the universal remote controllers.

INVENTION'S GOALS

This invention has a foremost goal to simplify a user's television viewing experience, particularly when it comes to finding, selecting and changing program choices. Ordinarily, programs are defined by "channels", or bands of frequencies utilized to carry the video and sound components of what is commonly known as a "television picture". In the United States, the Federal Communications Commission long ago authorized designation of thirteen VHF television channels. But issued assignments were limited to 12 channels, long known as channels 2 through 13. Years later, an additional 68 channels 14 through 82, and known as the "UHF channels", were added. More recently, cable distribution systems and satellite television systems have added many new, non-standard or virtual channels. For example, the channels 14 through 82 on a cable network generally do not correspond with the same frequency assignments given to over-the-air broadcasts.

The central goal for simplifying a user's ability to find and change channels is attained by permitting the user to merely enter the acronym for a desired program provider. This acronym may include popular over-the-air broadcast network acronyms, such as CBS for Columbia Broadcasting System. The acronym may also indicate a "cable network" such as Home Box Office HBO. A variation on the acronym concept may also allow the invention to accept the "call letters" of a TV station, such as WNAC (Boston, Mass.). Entering any of these acronymical combinations into the invention's device is normally accomplished by way of a number of alphabetically co-designated decimal keybuttons arranged on a keypad. The result of submitting the alphabetical acronym characters into the shared decimal keybuttons of the keypad is a development of an intermediate mesne value usually yielded by the keypad as a decimal number, such as 227 for the CBS acronym or 9622 for the station WNAC call-letters.

Quite transparent to the user of the invention is a logical adaptation of the intermediate decimal number into a valid channel selection number having either a real or virtual value. In one example, the goal is to utilize the intermediate decimal number, or mesne value, as address data to reach a channel number value preset in the storage cells of a memory device. The addressed channel number value is subsequently read-out of the addressed memory cell and wirelessly sent to the remotely controlled tuning device.

A further goal is to allow the user to establish a reading of an entry as being an acronym. To achieve this, the acronymical entries may be preceded by a mode definer keybutton actuation, indicating that an acronym is forthcoming. Otherwise, the acronym may be first entered, concluded with the function keybutton entry designating the precedent entry to be an acronym. Additionally, the acronymical entry may be bracketed between an opening and closing function keybutton entry.

More generally, the invention's goal is to discuss the manual entry of a mix of acronyms, real channel numbers and virtual channel numbers. The invention adapts these various inputs into decimal-based channel selection numbers which are subsequently sent by a wireless link to a television signal tuner to establish channel selection tuning.

SUMMARY OF INVENTION

A television viewer is provided with a convenient, portable and usually hand-held remote controller which accepts alpha-numerical entries. These entries may represent channel numbers and network acronyms, enabling a quick changing of a television signal receiver's tuning. As a result, program content is changed to coincide with the user's wishes.

Real and Virtual Channel Selection

For further understanding of this invention it is necessary to realize that a "REAL" channel number references an "over-the-air broadcast" channel number assigned in the USA by the FCC. A particular example is that of a real VHF Channel 4 assignment to a CBS station WBZ-TV in Boston, Mass. Similarly, it is known that a real VHF Channel 12 is assigned to WPRI-TV, an equivalent-content CBS affiliate station in Providence, R.I., while in metropolitan New York city the CBS affiliate station WCBS appears on Channel 2.

Another real channel number example is a UHF Channel 56 which is presently assigned to WLVI in Boston, Mass. When WLVI real channel 56 is sought on a representative AT&T-Broadband™ cable network, the user instead will find that the over-the-air real Channel 56 is shifted to a virtual channel 11 on the usual cable converter box or "cable ready" televisor setting. To confuse this issue further, in a nearby area serviced by the Adelphia™ cable system, the same real Channel 56 is instead shifted to virtual channel 08.

Still more confusion abounds when the FOX-TV station WFXT in Boston is shown moved from real Channel 25 to a virtual Channel 13 on the mentioned AT&T-Broadband™ cable network and a virtual Channel 22 on the Adelphia™ cable system. This means that the viewer must tune the cable box to the virtual channel 13 (or else the virtual channel 22) in order to receive the FOX station WFXT that broadcasts over-the-air on the real Channel 25.

A more problematic issue arises if the cable box is in fact tuned to channel 25. Instead of receiving the FOX station WFXT, the viewer will receive an unrelated channel and presently a Nickelodeon™ cable channel in the Barnstable, Mass. area and a Showtime™ movie channel in the Falmouth, Mass. area.

Practicable Incarnation

A remote controller having no additional keypad complexity and yet exhibiting the ability to satisfy several particular objectives of this invention may be taught to variously include these functions:

A. assigning alphabetical characters to each of a majority of the keybuttons on a decimal keypad;
B. manually entering an acronym using the assigned keybuttons;
C. reading the keypad to deliver an intermediate numerical sequence represented by the integer weight of each of the keybuttons operated to enter the acronym;
D. devising a presetable memory;
E. addressing the presetable memory;
F. reading out a preset numerical value representing a channel number from the addressed memory location;
G. sending the read-out channel number to the remotely controlled television set.

Class Definition of a User or Viewer

For purpose of my defining invention a "user" may be inherently singular or plural and generically describes one or more individual persons utilizing a television receiver, satellite receiver, cable box, VCR-machine or similar device for the purpose of tuning to a publicly available "channel" either broadcast "over-the-air", by satellite link or distributed through a cable system. Sometimes a user may be referred to as an viewer or subscriber and therefore the user shall be considered to include to any person designated as the operator of a remote control device used in conjunction with a TV-set, VCR machine, cable box, satellite receiver, "home theater" system or similar apparatus. The terms person, viewer, operator, user and subscriber are also intentionally gender neutral.

Definitions Terminology

For purpose of this description the following terms are defined:

TRUE CHANNEL NUMBER (also REAL CHANNEL NUMBER) is the ABSOLUTE channel number a program is distributed on (such as over-the-air, via cable or via satellite) and to which a television receiver must be locally tuned. Generally in this teaching, the TRUE or REAL channel number is the number entered into the keypad and the ABSOLUTE channel number is the command value sent to the controlled television receiver tuner.

VIRTUAL CHANNEL NUMBER is the channel to which an absolute channel number is shifted-to when sent over a cable or satellite distribution system. For example, a VIRTUAL channel 25 may be shifted to a TRUE channel 13 in one example.

ACRONYM is the program content providers acronymical "name", such as HBO for Home Box Office or NBC for National Broadcasting Company. It may also be used interchangeably for a television station's assigned call letters, such as WABC (New York Channel 7).

MESNE VALUE is the numerical equivalent to the ACRONYM entered through a keypad having co-assigned alphabetical and integer keybuttons. For example, the ACRONYM input NBC may deliver a MESNE value of 622.

COPULA VALUE is the numerical value an acronym or virtual keypad input may be converted into for processing intermediate between the keypad and the encoder. The COPULA value may correspond with or be equivalent to the MESNE value in many adaptations of the invention's teachings.

OBJECTIVES OF MY INVENTION

My invention's principal objective is to enable the entry of a network acronym and deliver a channel selection command to a televison receiver.

A foremost intent of my invention is to convert acronymical entries manually submitted through a keypad of the portable remote controller into encoded wireless channel selection commands which may be sent to a remotely located television signal tuner.

A goal of my invention is to provide a viewer with the convenience of remotely controlled channel selection when only the network or cable channel's acronym is known.

A further object of my invention is to permit a viewer to make ordinary entry of an acronym while the conversion to a numerical channel selection is performed transparently relative with the user, whereupon it is sent via a wireless command to a remotely located television signal tuner.

Still another object of my invention is to allow a television viewer to submit a "real" channel number for a TV-station through manual keypad entry while the remote controller converts the entry into a "virtual" channel number as a wireless command signal sent to the remotely situated television receiver.

Another object for my invention is to make transparent the shifting of "real" channel number manual keypad entries into "virtual" channel number wireless command signals.

Yet another object of my invention is to accept entry of a mix of acronymical and numerical channel selection designators and process the entries into a wireless command signal encoded to seek the intended channel number selection at a remotely situated television receiver.

An urgent consideration of my invention is to provide automatic translation of acronym and channel number entries into corresponding wireless channel selection commands presetably encoded to appropriately implement absolute channel selection tuning in the remotely controlled television receiver.

Additionally, a presetable memory is an intended object of the invention to provide for localized setting of the controller's memory to deliver a correspondent match between the entered acronyms or real channel numbers and absolute channel selection encoding of the wireless command signal.

A salient objective of my invention, particularly in it's conjunctive usage by senior citizens, physically challenged persons and children is to provide automatic translation of network acronyms, station call letters and real channel numbers into virtual channel numbers as encountered on cable distribution and satellite linked television systems.

It is these stated objectives and further methods and technical approaches which will be revealed to the knowledgeable artisan that serve to achieve the fundamental goals of my invention. These goals include an ability to enter acronymical or original channel number selection values into a keypad and obtain corresponding virtual channel number selection results by the remotely controlled apparatus. Furthermore, I show absolute operational independence between the obtained virtual channel number selection results while using a shared keypad as a common selection portal into which acronymical or numerical entries may be urged.

An extended capability for converting real channel number entries into virtual channel number commands is an adjunctive feature associated with the central capability for variously converting content provider acronyms into either presetable real or presetable virtual channel numbers.

A major advance taught by this invention is that any one of the real channel number, the virtual channel number and the acronymical representation of a network provider may be entered by the user using the same set of keypad buttons as taught by this invention. A principal advantage of this capability is to share the same array of ten keys commonly used to enter real channel number integers to also be usable to enter the integer values representing virtual channel numbers and the alphabetical characters depicting the network acronym. The result is an insignificant increase in keypad complexity over that of the prior art.

In a practicable expression of my invention, either one of the acronymical and the numerical value based keypad entry provision may be accomplished utilizing as few as one additional keybutton. The further goal is to allow entry of the elemental characters which compose an acronymical entry and which represent numerical entries to be submitted through the same shared decimal-based keybutton array. The same integer keys are shared on a common "10-button" decimal keypad arrangement to admit acronymical or numerical entries to establish channel number selections. In one preferred arrangement, the shared keys are given the following weights:

| | | | |
|---|---|---|---|
| 2,A,B,C; | 3,D,E,F; | 4,G,H,I; | 5,J,K,L; |
| 6,M,N,O; | 7,P,R,S; | 8,T,U,V; | 9,W,X,Y. |

My invention further instructs that the keypad entry provision may be variously configured beyond that of the common 10-key decimal keypad. The allowed configuration may depend upon the objectives of the maker and demands of the market to include additional keys, including a separate key assignment for each alphabetical character representative of any potential combination of acronymical entries a user might seek. It may also be configured to include an extra key for the alphabetical letters Q and Z ordinarily left-out of the typical Touchtone™ keypad layout.

The overall obvious goal underlying this invention is to enable a user to change channel selection tuning of a remotely controlled television signal receiver to a correct channel setting through the various entry of real channel number integers, virtual channel number integers and alphabetical characters representing a television program content provider's acronym, while maintaining a keypad layout including a minimal number of keybuttons.

DESCRIPTION OF DRAWINGS

My invention is depicted on 14 sheets of drawings including 13 Figures:

FIG. 3—Chart showing relationship between popular Acronyms and equivalent copula values discussed by this invention.

FIG. 10A and

FIG. 10B—A logical flow chart showing the various decision and function steps enabling keypad submissions of acronymical, virtual and real entries to develop an absolute channel selection value for a wireless command signal.

DESCRIPTION OF INVENTION

Figure 1:
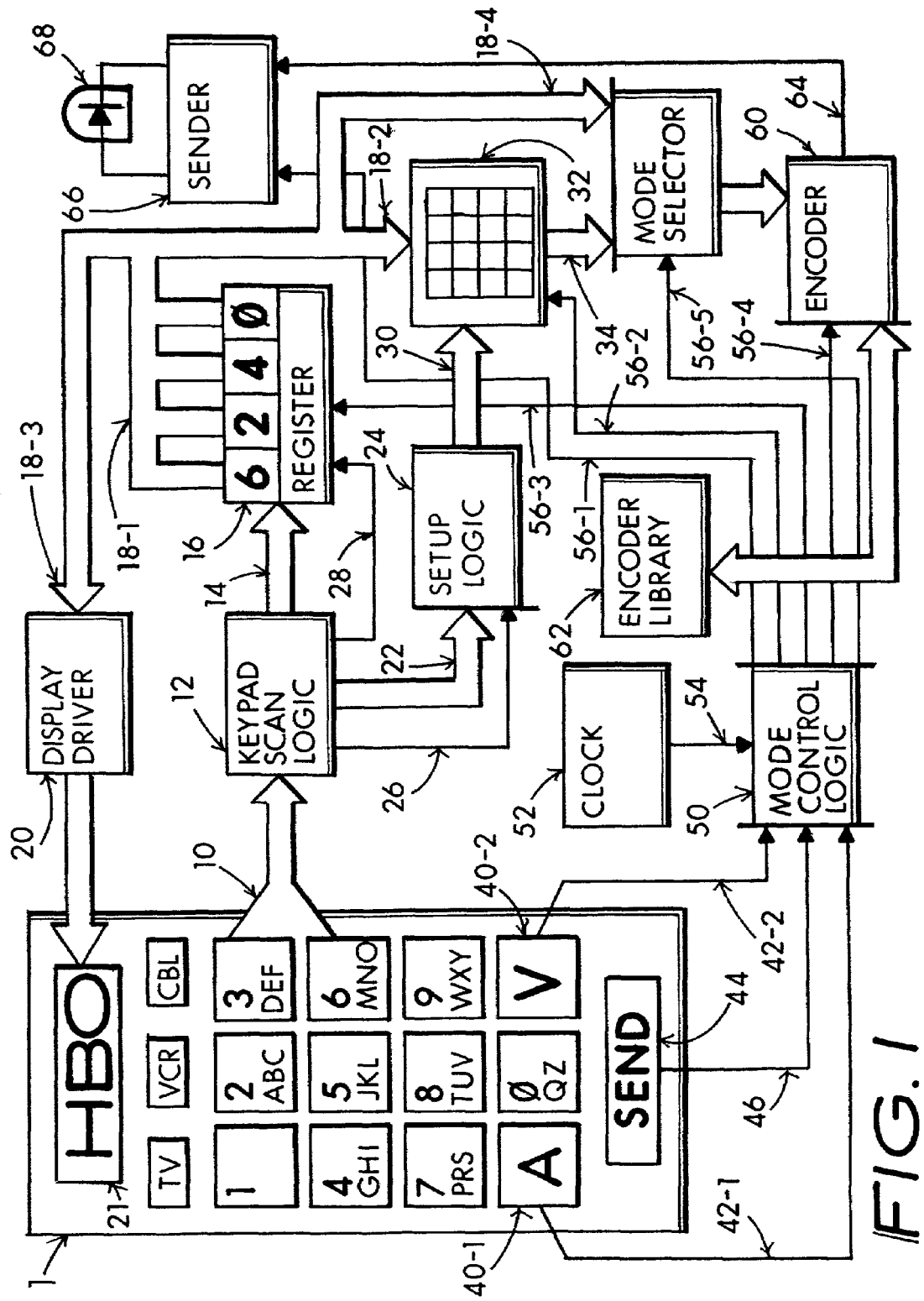
FIG. 1—Layout of a hand-held remote controller including keybuttons for introducing acronymical or virtual values, with processing of the data shown by various block functions to deliver a wireless channel command signal to a remotely controlled receiver.

In FIG. 1 a remote controller configuration 1 according to this invention's teaching is depicted to include a keypad supporting ten keybuttons co-assigned with integer values and alphabetical characters. The layout assignments of keybuttons 2 through 8 are similar to that encountered on a typical Touchtone™ telephone handset keypad.

I find that the public's almost universal familiarity with the ubiquitous Touchtone™ keypad layout is advantageously carried over into the arrangement of this device's keypad. A difference may be noted in that the zero 0 key is co-assigned with the alphabetical characters Q and Z, which are not ordinarily used in the usual telephone configuration. This layout extension is preferable, since some acronyms may include one of the characters Q or Z, such as in acronymical appearing television station call letters as for example WBZ in Boston, Mass., or popular network acronyms such as STARZ and QVC.

Common Acronym Usage Considerations

Over-the-air television programs are intended to be received by viewers on specifically assigned channels. A bulk of over-the-air programming is also affiliated with a network, for example, NBC, CBS, ABC, PBS, FOX, etc.

Cable and satellite programming is also known to have well known "program content provider" or network associations, again for example: HBO, CNN, HSN, MTV, GAC, TNN, etc. As a result, certain programs are often related by the public with specific networks. For example, the program "The Tonight Show" is presented by Jay Leno on NBC, whilst the popular dramatic series "The Sopranos" appears on HBO. NBC is well known to appear on a diversity of "real" channels in various major cities. For example, in Boston, Mass. "The Tonight Show" and other NBC programs such as "Jeopardy!" appear over-the-air on NBC's "real" channel 7 while in Providence, R.I. the same NBC programs appear on the real channel 10, and in metropolitan New York City the NBC programs appear on channel 4. In other words, while the network (and the related acronym) is consistent throughout the nation, the real channel number assignments for receiving NBC programming differs from city to city, or in different geographical service regions.

Cable service providers (CSP) and particularly satellite service providers (SSP) will often provide standard network programming, such as NBC, HBO, etc. on "virtual" or offset channel numbers having no obvious relationship with their real counterparts, e.g., the local over-the-air channel number assignments. For example, it is not unusual for an AT&T-Broadband™ cable service subscriber to be viewing a FOX program which appears over-the-air on FCC assigned real channel 25 instead shifted to a virtual channel 13 in one town, while in a nearby town an Adelphia™ cable service subscriber will find the same "channel 25" FOX program shifted to virtual channel 22.

The various keybuttons couple 10 with a keypad scan interface logic 12 that routes 14 keybutton value entries to a register 16. For this illustrative example, if the value HBO is entered into the appropriately co-assigned keybuttons, the register will receive a mesne value of 426 as derived from the co-assigned alpha-numerical keybuttons.

The register 16 is depicted to have 4 stages 0,1,2 and 3 but in practice may have more or fewer. Each keypress sends a "clocking" signal on line 28 which advances the register 16 upon receipt of the individual entry value. The mesne value obtained from the keypad appears as a right-shifted entry in the register 16, held in the register's cells as 6240, with the LSB on the left consistent with usual right-shift register entry. The register output lines 18-1 severally couple with a display driver 20 via route 18-3. The display driver output urges the LCD or LED display 21 to show the present entries, such as the depicted acronym entry HBO in this example.

The variously routed register 16 outputs also couple 18-2 with the address ports of a storage device 32. The storage device includes cells which have been set-up by a keypad command coupled 22 with a setup logic controller 24 to route user directed values on line 30 for storage in the cells. Most particularly, this set-up permits a conversion of the acronymical keypad entry mesne values to be converted into absolute channel numbers delivered on line 34.

A mode control logic function 50 is included to have inputs coupled with an "A" (acronymic) keybutton 40-1 and a "V" (virtual) keybutton 40-2, as well as a "SEND" keybutton 44. Observe that the "A" keybutton 40-1 delivers an actuation command on line 42-1 to the mode control logic 50. Similarly, the "V" keybutton delivers an actuation signal on line 42-2 while the "SEND" keybutton delivers it's actuation signal over line 46. Additionally a clock 52 delivers a signal on line 54 for timing events. This mode control logic serves to deliver various command signals on the several lines 56-1 through 56-5 which implement the remote controller's immediate operating characteristics.

Line 56-3 commands the register 16 to deliver a value readout on lines 18-1. Line 56-2 further instructs the memory 32 to read-out data stored in an addressed storage cell onto line 34. Line 56-5 serves to establish the select mode as either an intermediate copula value or a real channel number value. Two main modes are shown. One is to deliver absolute channel number values from line 34 which represent the converted acronym or virtual values entered into the keypad. The other mode is to deliver the real keypad entry value as corresponding with the absolute channel number, when no conversion is necessary. The mode selector 36 output bus couples with an encoder 60. The encoder is responsible for establishing the unique signal pattern recognizable by the remotely controlled television receiver in accord with device specific enciphering data stored in an encoder library 62.

The encoder is instructed by a signal on line 56-4 to deliver the encoded channel number value on line 64 to a sender 66. In response to a "send" signal on line 56-1, the sender 66 delivers an encoded signal to an emitter 68, such as a light emitting diode but which may also be a radio frequency antenna or other wireless coupling device.

Figure 2:
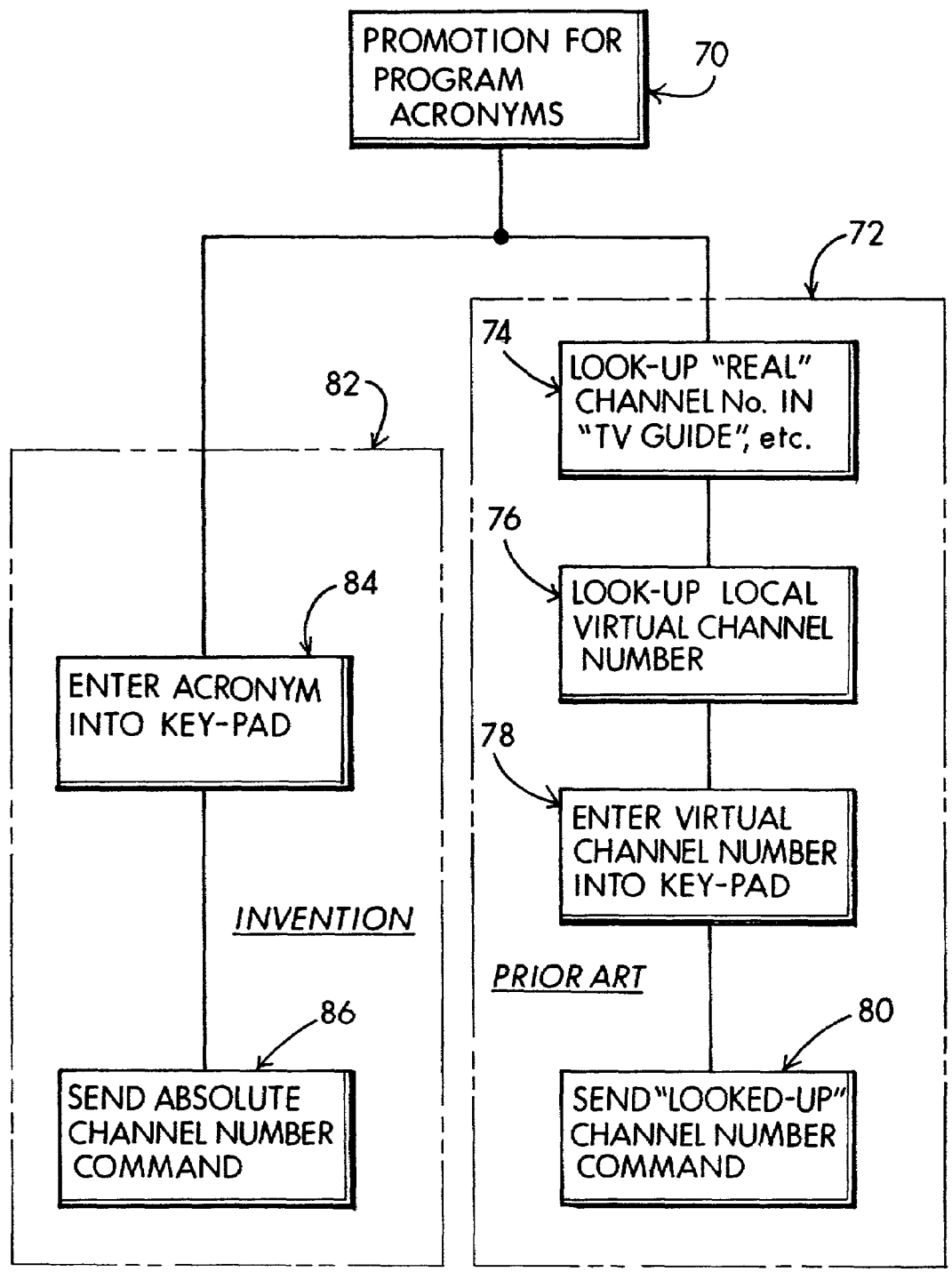
FIG. 2—A procedural block diagram of the invention's improvement in relation to prior art.

The problem which this invention addresses is depicted in FIG. 2. The basic issue is finding what channel a television receiver must be tuned to receive a particular program known only by its network acronym or station call letters. For example, the FOX network touts promotion of many forthcoming programs to appear on FOX. But it does not give the channel number in the viewer's area: only the FOX acronym. Therefore such promotion for a program acronym is the first step 70. In the PRIOR ART arrangement 72, a look-up 74 of a "real" channel number associated with the promoted acronym which is available in the viewer's area, such as channel 25 for WFXT in an Eastern Massachusetts area. Usually the viewer looks-up the channel number in a publication, such as "TV Times", edited for his viewing area.

The step 74 look-up is followed by a subsequential look-up 76 of the virtual channel number which carries the real channel 25 for FOX programming. Cable and satellite systems often shift real channel numbers to virtual channel numbers for distribution, for a variety of technical and business reasons. In this mentioned example, the user will find that the real channel 25 FOX station is carried on the virtual channel 13 in the cable network.

Upon finding channel 13 as the correct channel to tune the FOX programming, it is up to the user to enter the virtual channel 13 entry into a keypad in step 78. Upon keypad entry, the virtual channel 13 is sent 80 as an absolute channel change command to the remotely located television receiver.

In this invention 82, the mentioned steps 74, 76 and 78 are supplanted with one automatic step 84 in which the FOX acronym is entered directly into the keypad and a subsequent absolute channel selection command representing the virtual channel 13 (in this example) is sent by the sender 86 to the remotely located television receiver.

Acronymic to Copula Value Conversions

Recognize that the entry of an acronym into a decimal keypad yields a concurrently intermediate numerical equivalent, or mesne value. In the telecommunications field, this known equivalence is the heart of the common telephone Touchtone™ keypad.

Although a user enters a name, such as BESTBED, the telephone system sees the alphabetical character entry as merely a series of integers. Hence, (BESTBED=237-8233).

In a similar way, this principal of entering the characters of a network's acronym such as ESPN into a co-assigned alpha-numerical keypad yields an array of unique number combinations such as 3776 and other combinations as now shown in FIG. 3 as a chart 88. Note for example that the FOX network acronym enters as 369, while the MTV network acronym is seen as 688, using the layout of keypad 1 of FIG. 1. Obviously, other proprietary layouts may be engineered, with different relationships between the co-assignment of the alphabetical characters and the integer keybuttons.

Figure 4:
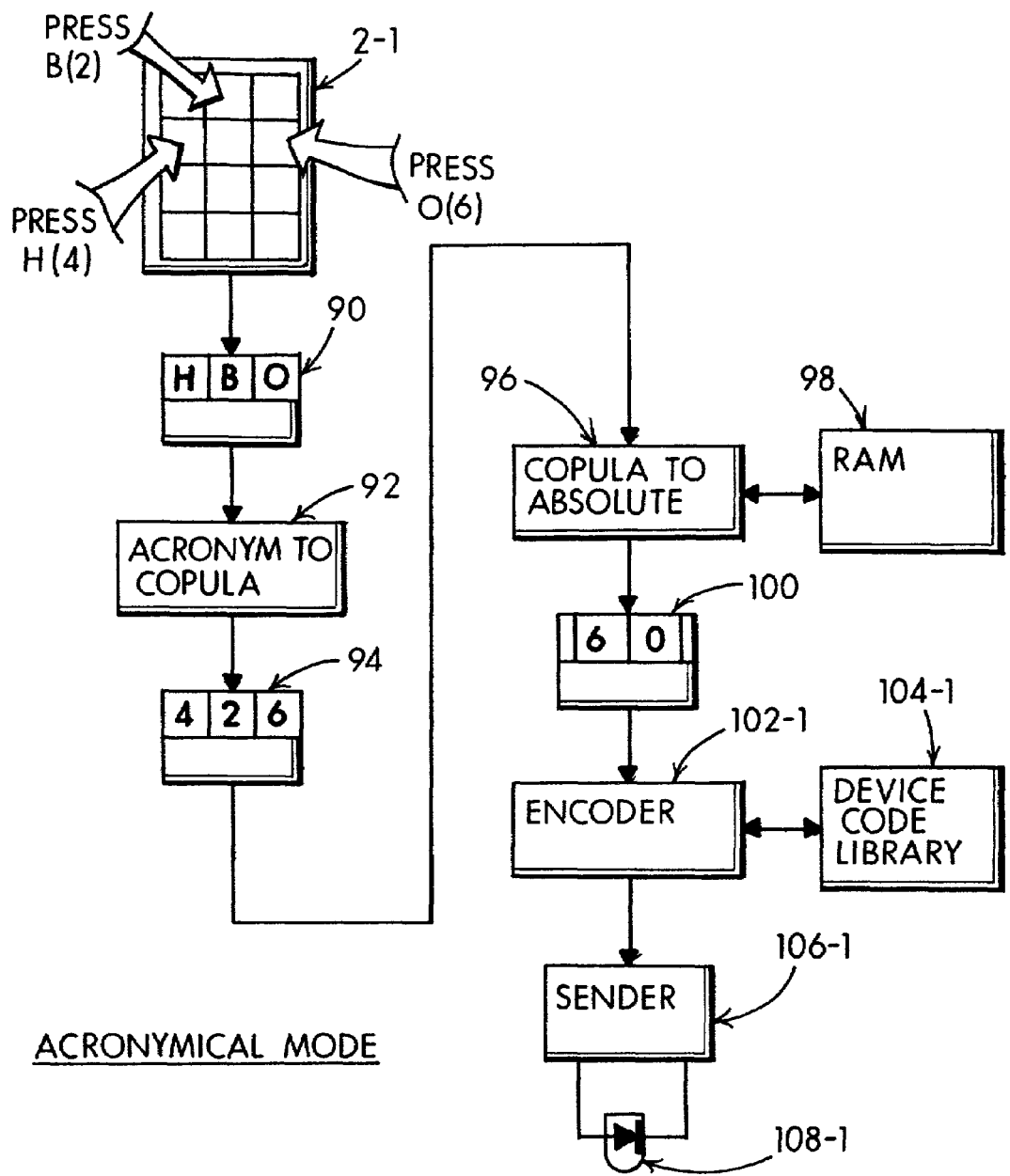
FIG. 4—A block diagram of a process for adapting an acronymical entry into an absolute channel selection as a wireless command signal.

FIG. 4 more particularly shows how an acronym such as HBO may be entered into the keypad 2-1, by pressing the H (or 4) key, the B (or 2) key and the 0 (or 6) key in succession. This translates the real entry to a register 90. Next a real value to intermediate copula value change occurs in event 92, delivering the copula value 426 to a register 94.

The register 94 output couples with a copula to absolute value converter which depends upon data stored in a RAM 98 to deliver a virtual channel number such as 60 to a register 100. The absolute channel number and virtual channel number are coequal, as coupled with an encoder 102-1. The encoder uniquely keys the absolute channel number command to match the remotely controlled receiver, using data stored in a device code ROM 104-1. The result is a sending of the absolute channel number command via a sender 106-1 and wireless signal emitter 108-1, such as an infrared LED.

Figure 5:
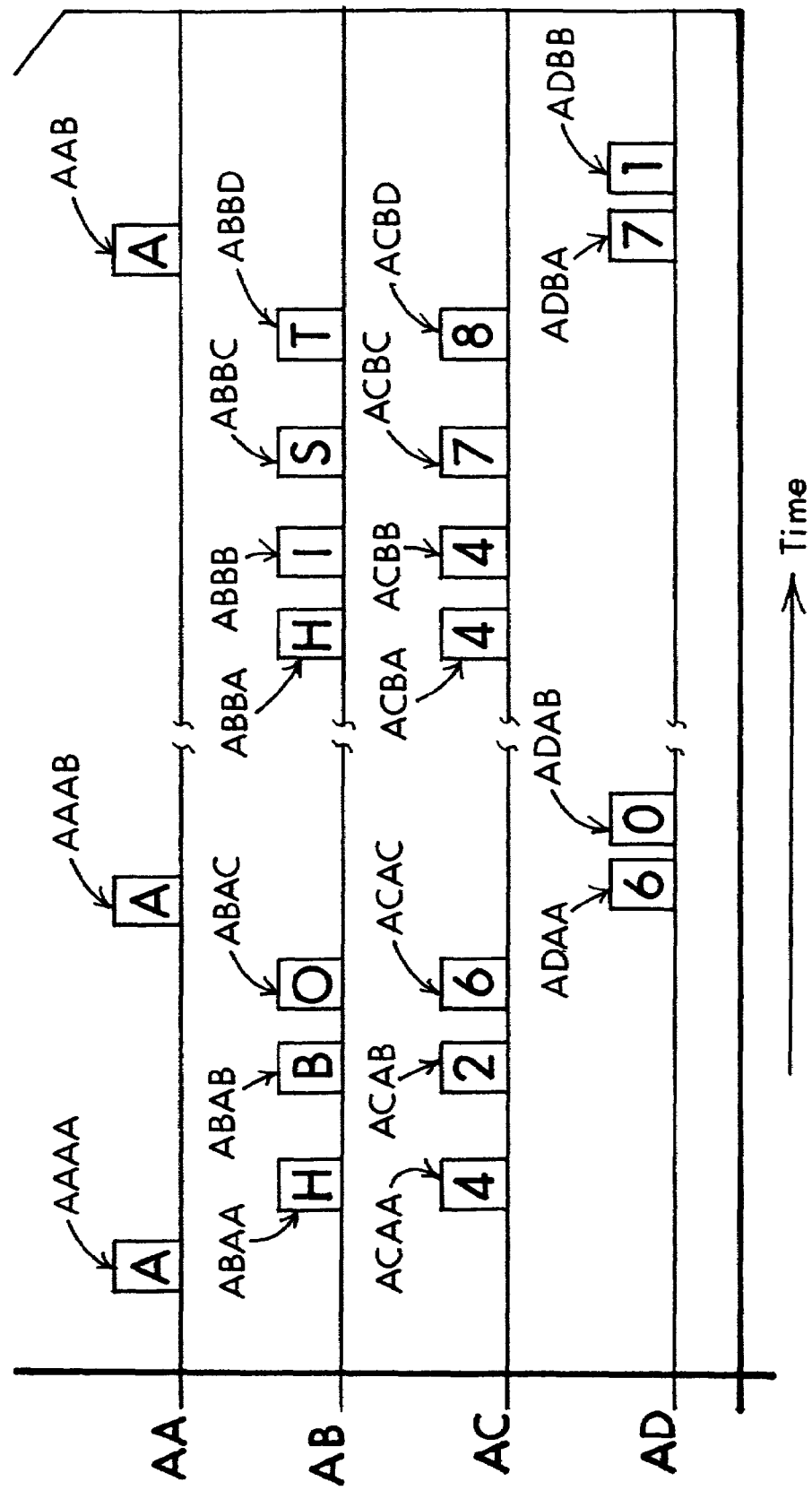
FIG. 5—An event diagram depicting the steps as related to the process sequence discussed relative with FIG. 4.

A timing diagram shown in FIG. 5 further depicts the events associated with FIG. 4. Two sub-modes are shown. The first includes an actuation AAAA of the "A" or acronymical entry key of FIG. 1. In this example, the entry of the acronym characters HBO, shown as entries ABAA, ABAB, ABAC are depicted in association with the corresponding copula entries 426, appearing as ACAA, ACAB and ACAC. Next, the "A" entry AAAB is again submitted, resulting in the delivery of the virtual (or absolute) channel number 60, shown as ADAA, ADAB. What this shows is that 2, 3, 4 or more acronymical characters may be submitted as shown on line AB to occur bracketed between the first and subsequent mode selection entry shown on line AA.

In a similar manner FIG. 5 next shows a second sub-mode where the acronymical characters, such as HIST are first submitted ABBA, ABBB, ABBC, ABBD as a character string on line AB concurrent with a subsequential integer string representing the corresponding copula values 4478 shown as ACBA, ACBB, ACBC, ACBD on line AC. Note that the time spacing between the entries ABAA, ABAB relative with the time between entries ARAB, ABAC may differ; similarly, the time difference between the several entries ABBA, ABBB, ABBC and ABBD may vary. This exemplifies the time independence between entry immediacy, allowing the user to be more casual in how long it takes to make each entry in an acronymical entry sequence. This inherent entry timing flexibility offered by this invention particularly benefits elderly and frail users, physically challenged persons and more generally any user who is making entries in a darkened room or under other difficult circumstances. When entry of the several acronym character entries depicted on line AB are complete, the "A" key, such as 40-1 of FIG. 1 is then actuated AAB denoting the completion of the acronymical entry. This action initiates a concurrent onset of a delivery of the virtual channel number 71 now shown as ADBA, ADBB on line AD.

Figure 6:
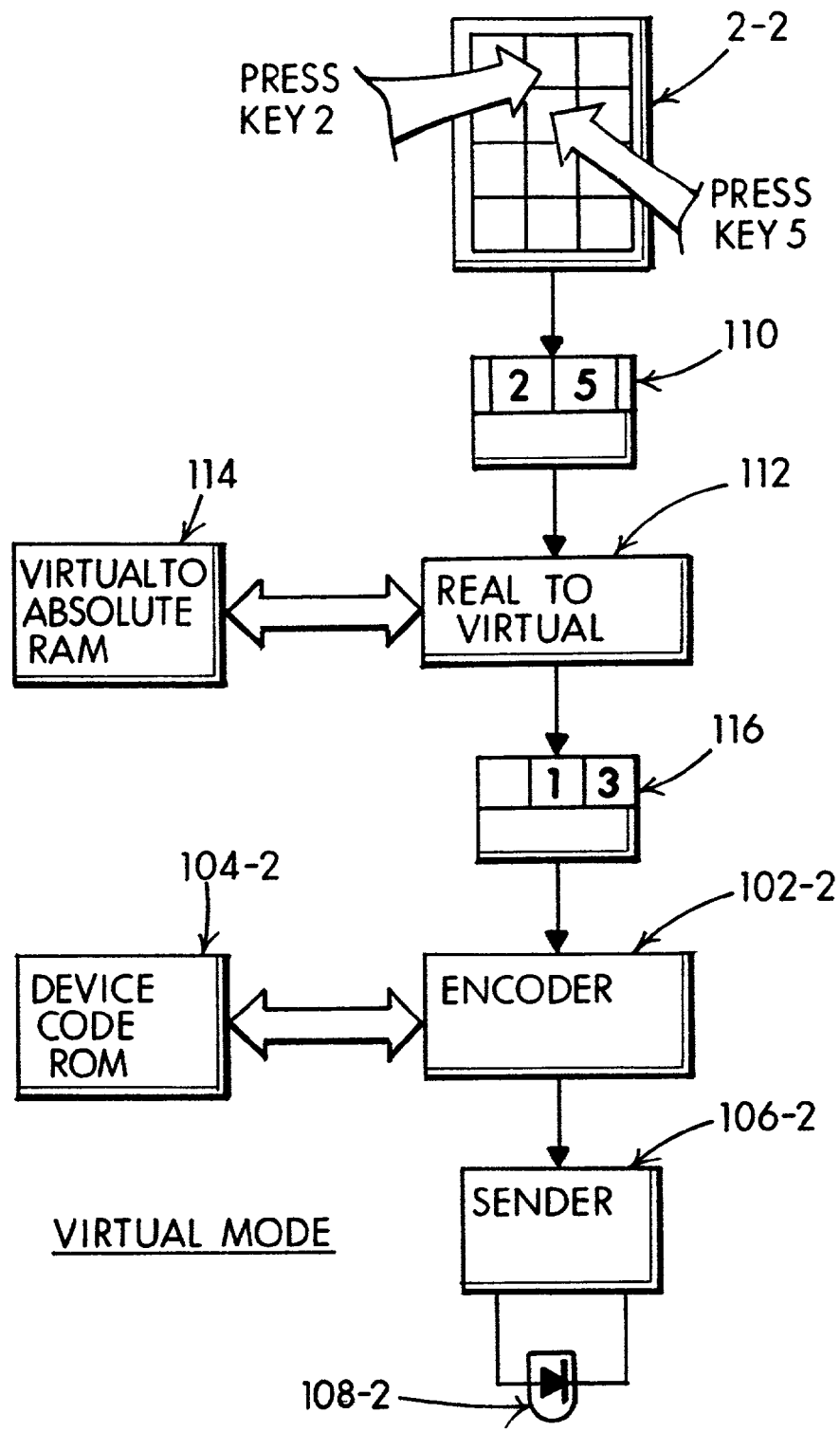
FIG. 6—A block diagram of a process for adapting a virtual entry into an absolute channel selection as a wireless command signal.

Automatic conversion of a real channel number selection, such as given for FOX over-the-air station WFXT, channel 25 into a virtual channel 13 value for a typical cable system is now shown in FIG. 6. The channel number string including entries "2" and "5" is submitted through a keypad 2-2 and entered into a register 110. A "real to virtual" conversion in function 112 is prompted by the virtual equivalent data held in a RAM 114. Using a RAM enables changes to be admitted to the memory 114 in accord with any local changes in real to virtual channel assignment relationships which may be introduced by a service provider from time to time.

In this example of FIG. 6, the virtual equivalent channel 13 appears in a register 116 and is subsequently delivered to an encoder 102-2. The encoder, in conjunction with data stored in a device code, or library ROM 104-2 delivers a uniquely encrypted signal to the sender 106-2 which translates the encrypted virtual channel command signal via a wireless emitter 108-2, such as an infrared LED.

I depict the register 116 to provide three-digit storage such as might be utilized with satellite receivers. However this is merely an engineering detail and a register having other storage capacities may be utilized without departing from the teaching.

Figure 7:
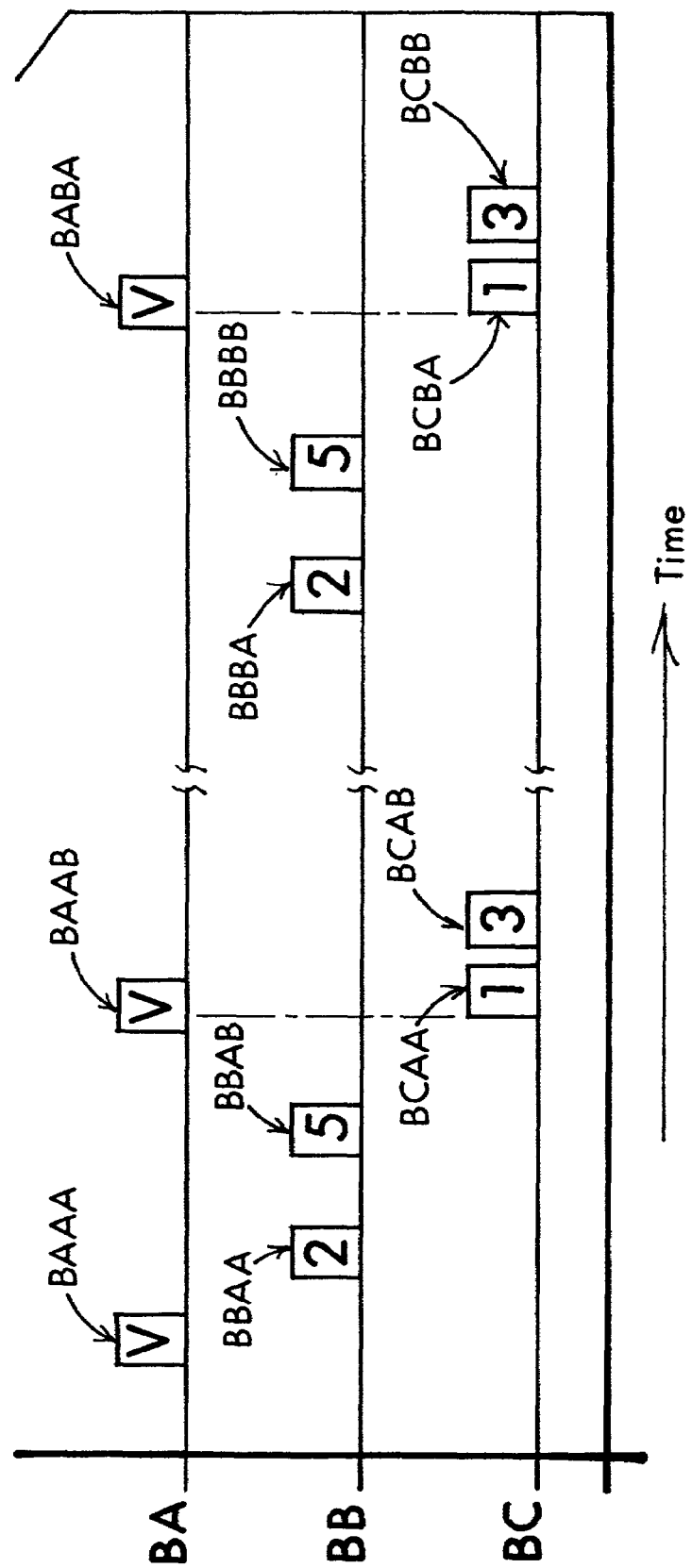
FIG. 7—An event diagram depicting the steps as related to the process sequence discussed relative with FIG. 5.

A timing diag+ram shown in FIG. 7 serves to better depict the events associated with FIG. 6. Two sub-modes are shown. The first includes an actuation BAAA of the "V" or acronymical entry key 40-2 of FIG. 1. With this example, a subsequential entry of the numerical string defining the real channel number 25, shown as entries BBAA, BBAB are depicted. Next, the "V" entry BAAB is again submitted, resulting in the delivery of the virtual (or absolute) channel number 13, shown as an integer string BCAA, BCAB. What this shows is that entry strings including 2, 3, 4 or more channel number integers may be submitted as shown on line BB to occur bracketed between the first and subsequent mode selection entry shown on line BA.

In a similar manner FIG. 7 shows a second sub-mode where the acronymical characters, such as 25 are first submitted BBBA, BBBB on line BB. When entry of the several real channel number integer entries depicted on line BB are complete, the "V" key, such as 40-2 of FIG. 1 is then actuated BABA denoting the completion of the real channel number entry. This action initiates a concurrent onset of a delivery of the integer string representing the virtual channel number 13 now shown as BCBA, BCBB on line BC.

Figure 8:
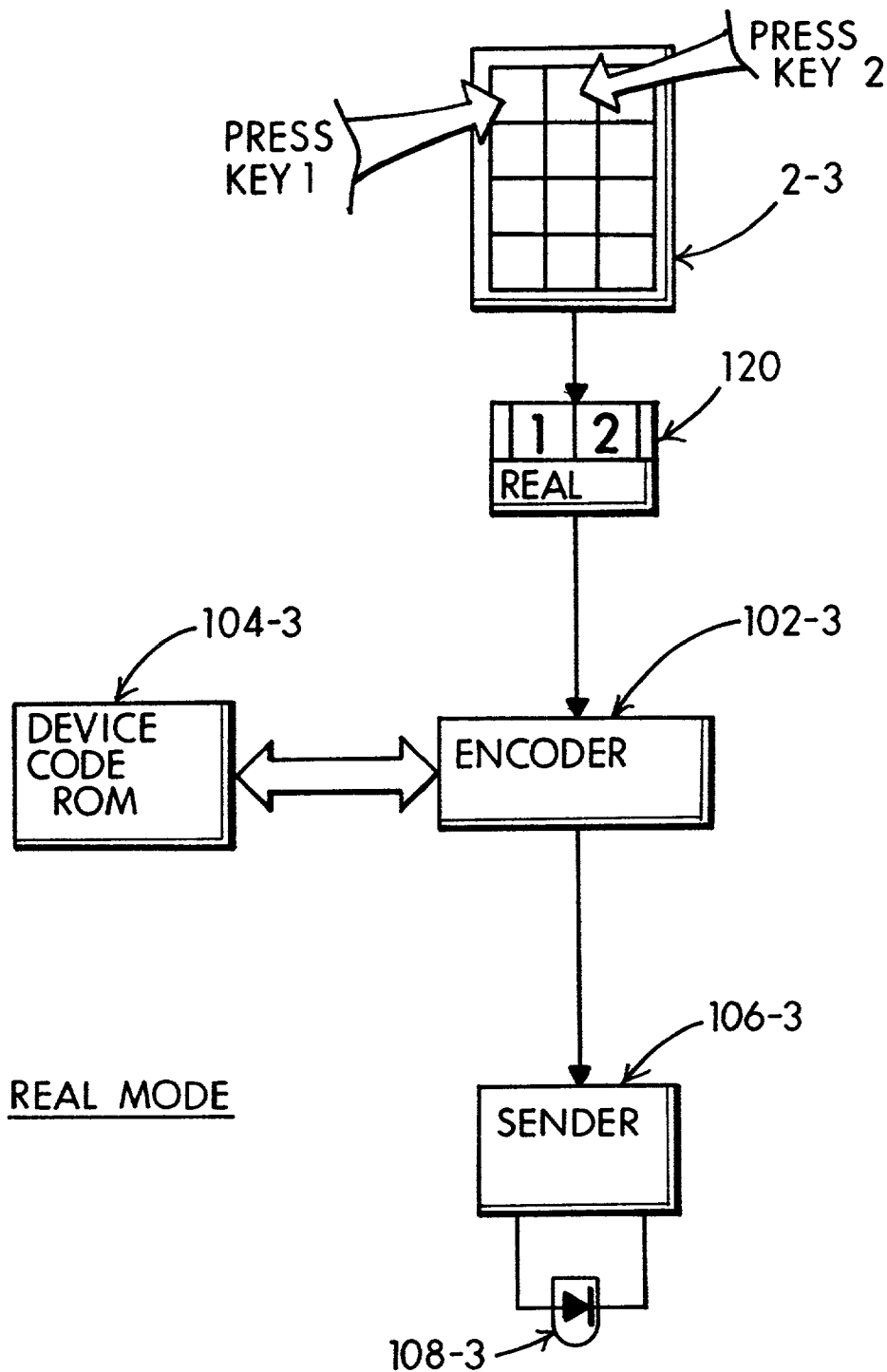
FIG. 8—A block diagram of a process for adapting a real channel number entry into an absolute channel selection as a wireless command signal.

Under some circumstances the real, or over-the-air channel number and the cable assignment channel number are the same. For example, station WPRI channel 12 in Providence, R.I. is also distributed over most of the areas cable systems as cable channel 12. In FIG. 8 the real channel 12 entry is submitted via a keypad 2-3 and stored in a register 120. The register 120 output is then directly submitted to an encoder 102-3 which utilizes the device code library ROM 104-3 values to deliver an encrypted "channel 12" command signal to the sender 106-3 that excites the wireless emitter 108-3.

Figure 9:
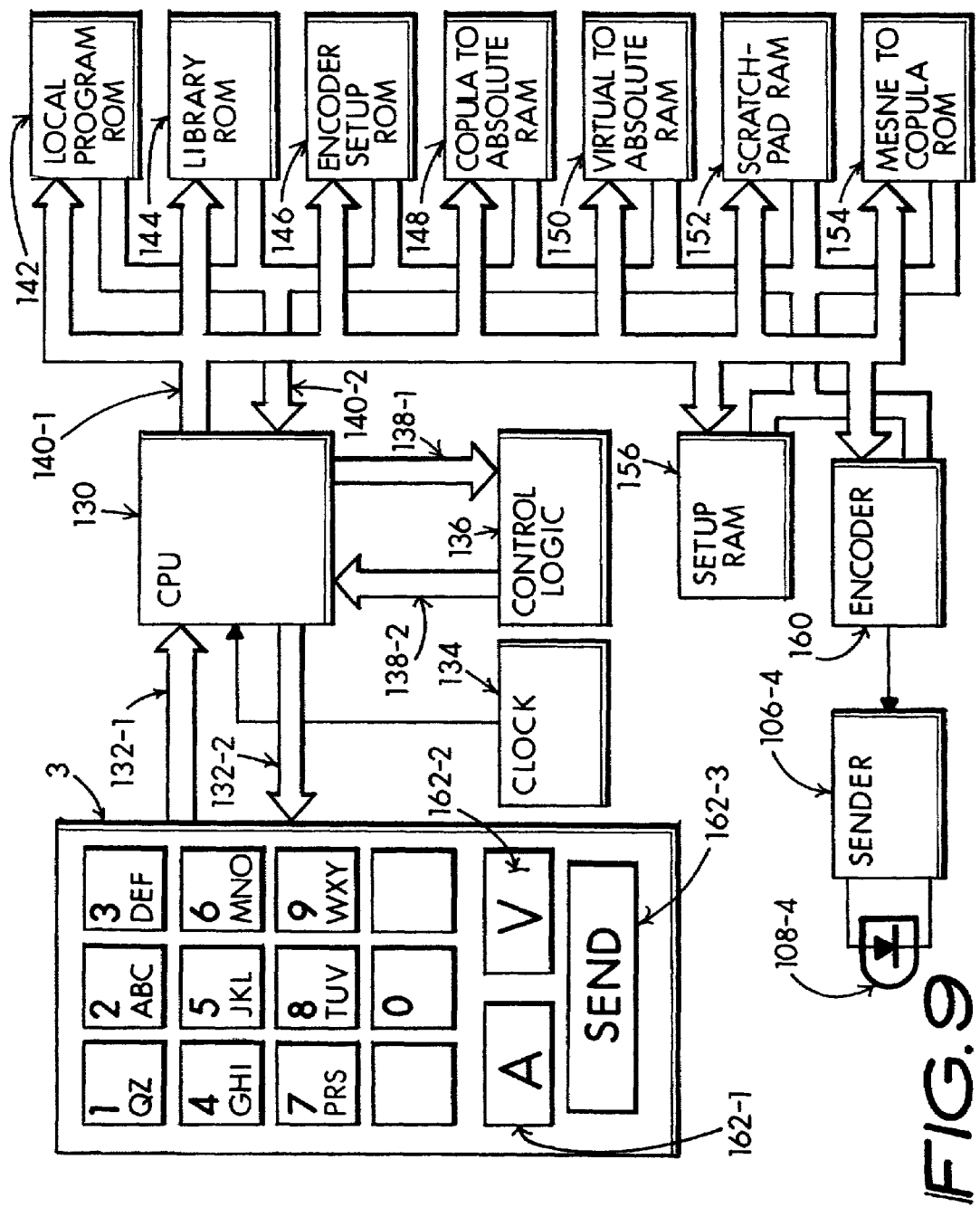
FIG. 9—A functional block diagram showing the use of a microprocessor for satisfying the process and control functions of the invention.

A microprocessor such as an 8051, Z80B or any of a variety of other ASIC types may provide a CPU function 130 of FIG. 9. A handheld portable keypad 3 provides a number of co-assigned integer and alphabetical value keybuttons (similar to that of FIG. 1) which permit entry of real channel numbers, virtual channel numbers, station call-letters and acronyms. Various combinations of keybutton entries are bused between the CPU and the keypad via lines 132-1, 132-2. A clock 134 provides system timing. Control logic functions 136 support the microprocessor's various local housekeeping logic needs, as coupled through data bus lines 138-1, 138-2.

An address bus 140-1 and a data bus 140-2 couple the CPU with a number of ancillary device functions, including: a local program ROM 142 defining the device's operational personality; a library ROM 144 for storing encoding data; an encoder setup RAM 146 for defining various combinations of controlled devices such as a TV-set, VCR machine, etc.; a copula to absolute value conversion RAM 148; a virtual to absolute value conversion RAM 150; a keypad scratchpad RAM 152; a keypad entry to copula value conversion ROM 154 (if needed); and a setup mapping RAM 156. Additionally, the data is submitted to an encoder 160 which in conjunction with the library ROM 144 data delivers an encrypted command signal to the sender 106-4 and wireless emitter 108-4. Observe that the keypad in this depiction includes separate acronym mode 162-1 and virtual mode 162-2 keybuttons. A distinctly separate SEND keybutton 162-3 is also provided. Note also that the alphabetical characters Q and Z share the integer 1 keybutton in this illustrative arrangement, showing that these or any of the alphabetical characters may be uniquely engineered to be variously co-assigned with any mix of the integer keybuttons.

Figure 10B:
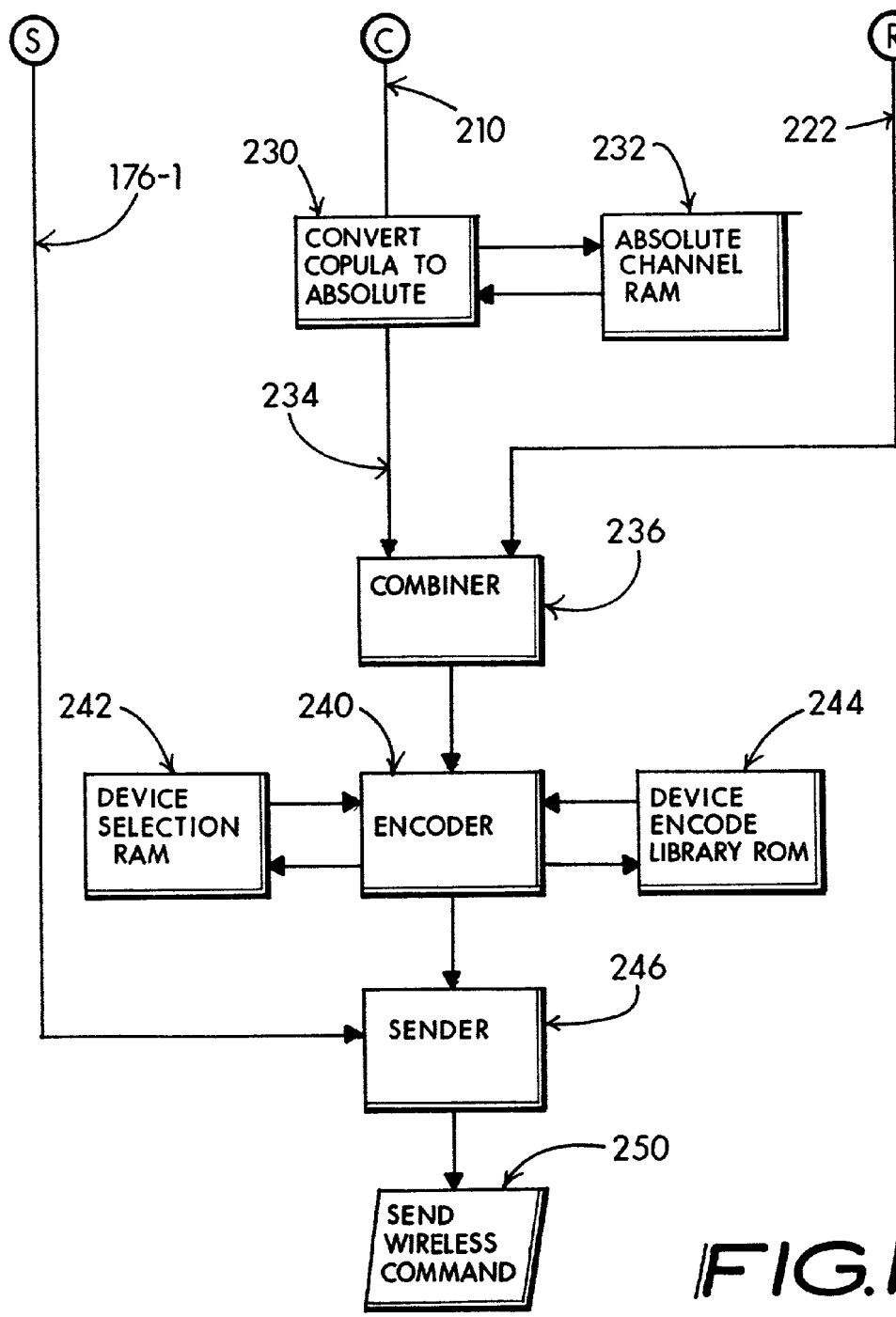

Jointly referring to FIG. 10A and FIG. 10B provides a flow chart or functional diagram for an illustrative example for the invention. Keypad entries may be submitted 170 as any variety of real, virtual or acronymical combinations, together with a SEND command as suggested by keybutton 44 of FIG. 1 or keybutton 162-3 of FIG. 9.

A resolution of the keypad entries begins by coupling 172 the keypad with a SEND? query function 174. A NO decision delivers 176-2 the keypad entry to an ACRONYM query function 180. If the keypad entry represents an acronym, a YES decision results in transfer of the keypad entry data 182-1 to a read mesne value function 184. In other words, a keypad entry of "E" for example, results in the co-assigned integer keypad value of "3" as the mesne value coupled with the mesne value to copula value adaptation function 186. A copula value (which may ordinarily be the same as the mesne value) is derived by the adaptation function 186 optionally in conjunction with a copula data ROM 190. The copula value thence couples with a combiner 208 to a port (C) 210. The combiner 208 output in effect couples with a copula to absolute (or real) value converter function 230. Conversion factors are determined by data stored in an absolute channel number RAM 232 during setup of the controller. In other words, the RAM 232 data will ordinarily be different for any one of a number of cable or satellite based signal distribution systems. The real or absolute channel number on line 234 couples via a combiner 236 with an encoder 240. The encoder depends upon a device selection RAM 242 which is preset during device setup to define a particular "make and model" for a remotely controlled apparatus. Similarly the encoder depends upon a device code library ROM which is typically preloaded with a multitude of encryption codes unique to a near-universal variety of "makes and models" of controlled devices, such as TV-sets, VCR machines, cable boxes, etc. The encoder output couples with a sender 246.

Looking back to the keypad entry 170. If a SEND entry such as might be initiated by SEND keybutton 44 of FIG. 1 is recognized by the SEND? query function 174, a YES signal on line 176-1 as linked through the (S) port to the sender 246 establishes that the sender 246 will "send" the encoded channel number as a selection command as denoted by the send wireless command function 250.

Reverting back to the keypad entry 170 and allowing for a virtual channel number entry, such as the earlier discussed FOX "channel 25" the value is applied 182-2 to a virtual query function 200 and a (virtual=yes) decision results in the keypad entry data to appear on line 202-1 as coupled with the read virtual value function 204 (usually a register function). The output of the function 204 couples with a virtual to copula value adapter 206. Typically the copula value and the virtual value are equivalent, as coupled to the combiner 208.

As for the acronymical conversions, the copula value on line 210 is converted to an absolute channel number, subsequently encoded and then sent to the remotely controlled device as a wireless command 250 in response to a SEND command.

In event the keypad inputs are determined as NOT an acronym and NOT a virtual entry, the keypad values are translated 202-2 to a real query function 216. If the keypad inputs are valid combinations of real channel numbers, their value is coupled via line 218-1 to a real to absolute conversion function. Typically, the real and absolute values are the same in this mode. If the keypad inputs are invalid combinations as recognized by the query function 216 the NO output 218-2 loops back to the keypad entry 170 awaiting the next keypad entry. Typically, this occurs when keypad scanning is utilized and the loopback ordinarily occurs in absence of a recognized keybutton entry during repeated keypad scanning.

The real channel number as converted to the absolute value channel number couples 222 to the (R) port and thence directly to the combiner 236. From this point, operation is similar in the functioning of the encoder and SEND command for effectuating a send wireless command 250 representative of the real channel number.

Figure 11:
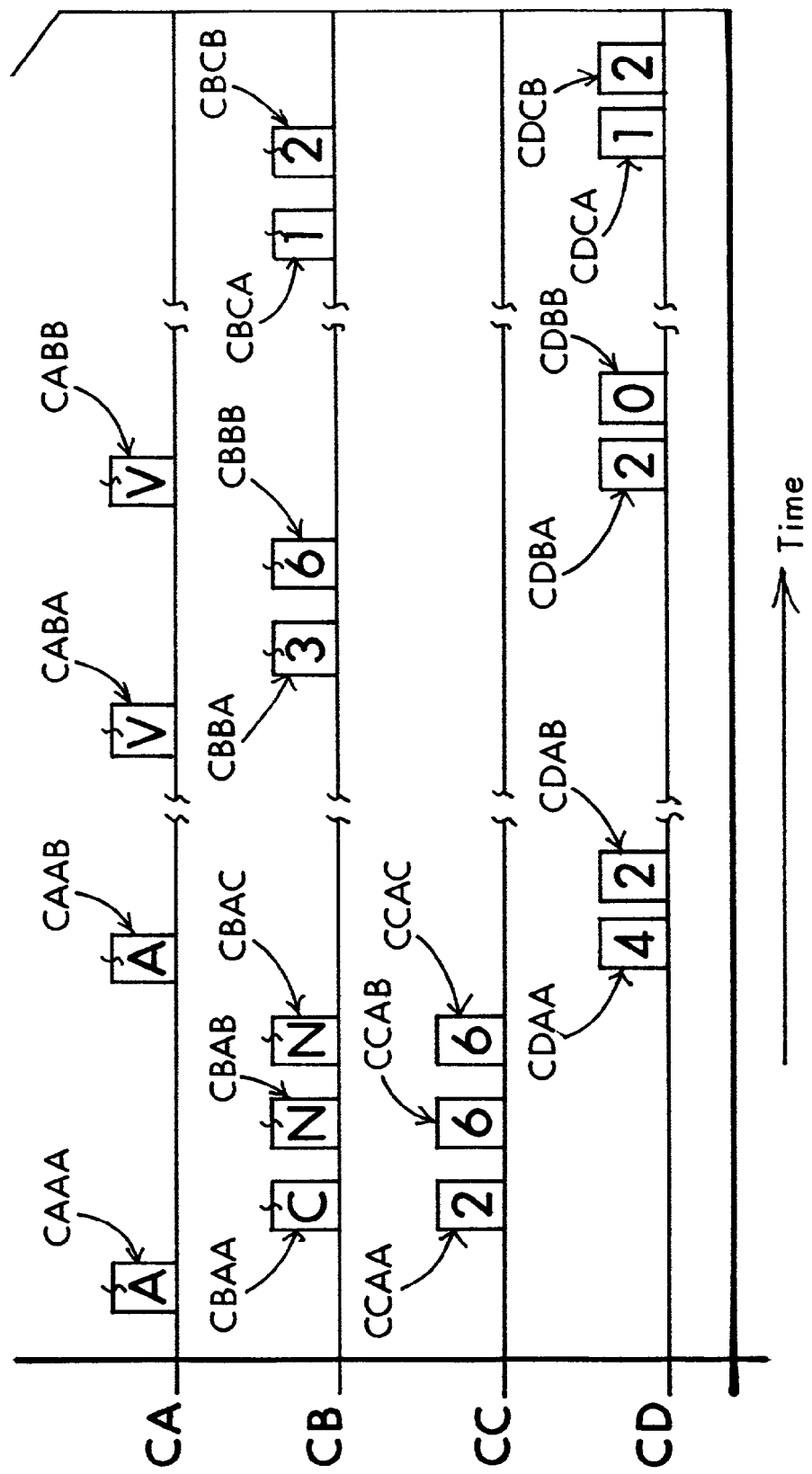
FIG. 11—An event diagram associable with FIGS. 10A and 10B depicting duplicitous mode key entry to establish acronymical or virtual keypad urged input data entries.

A depiction of events is shown in FIG. 11 relative with converting an acronymical, virtual or real keypad entries into an absolute value sendable channel number command submitted to a remotely controlled television receiver or other device. This diagram shows three principal modes: acronymical, virtual and real.

In the acronymical mode, an "A" keybutton 40-1 entry CAAA is first submitted as shown on line CA, followed by several keybutton entries on line CB representing the letters of an acronym. In this example, the acronym "CNN" is shown CBAA, CBAB, CRAC. Sharing co-assigned integer keys results in the concurrent entry of a mesne equivalent value CCAA, CCAB, CCAC shown on line CC as "266". As mentioned earlier relative with FIG. 10A the read mesne value 184 is adapted to a copula value 186. Subsequently, as said for FIG. 10B the copula value is then converted to an absolute value by function 230 subsequent to a second entry CAAB of the "A" keybutton 40-1. This results in the delivery of an absolute channel number command value CDAA, CDAB on line CD and shown as channel "42".

In the virtual mode, a "V" keybutton 40-2 entry CABA is first submitted, followed by the keybutton entries representing the integers of the virtual channel number. In this example, the virtual channel "36" is shown CBBA, CBBB. As shown by function 220 of FIG. 10A, the virtual channel number entry is next converted to its equivalent absolute value CDBA, CDBB and shown as "20" immediately subsequent to the second entry CABB of the "V" keybutton 40-2.

A real mode is recognized when no "A" or "V" keybutton 40-1, 40-2 is actuated, as shown lacking on line CA, prior to the keybutton integer entry of real integer values CBCA, CBCB for a "real" channel 12 selection. The real channel 12 entry is adapted by function 220 of FIG. 9A to the absolute channel 12 value CDEA, CDCB for sending to the remotely controlled receiver.

Figure 12:
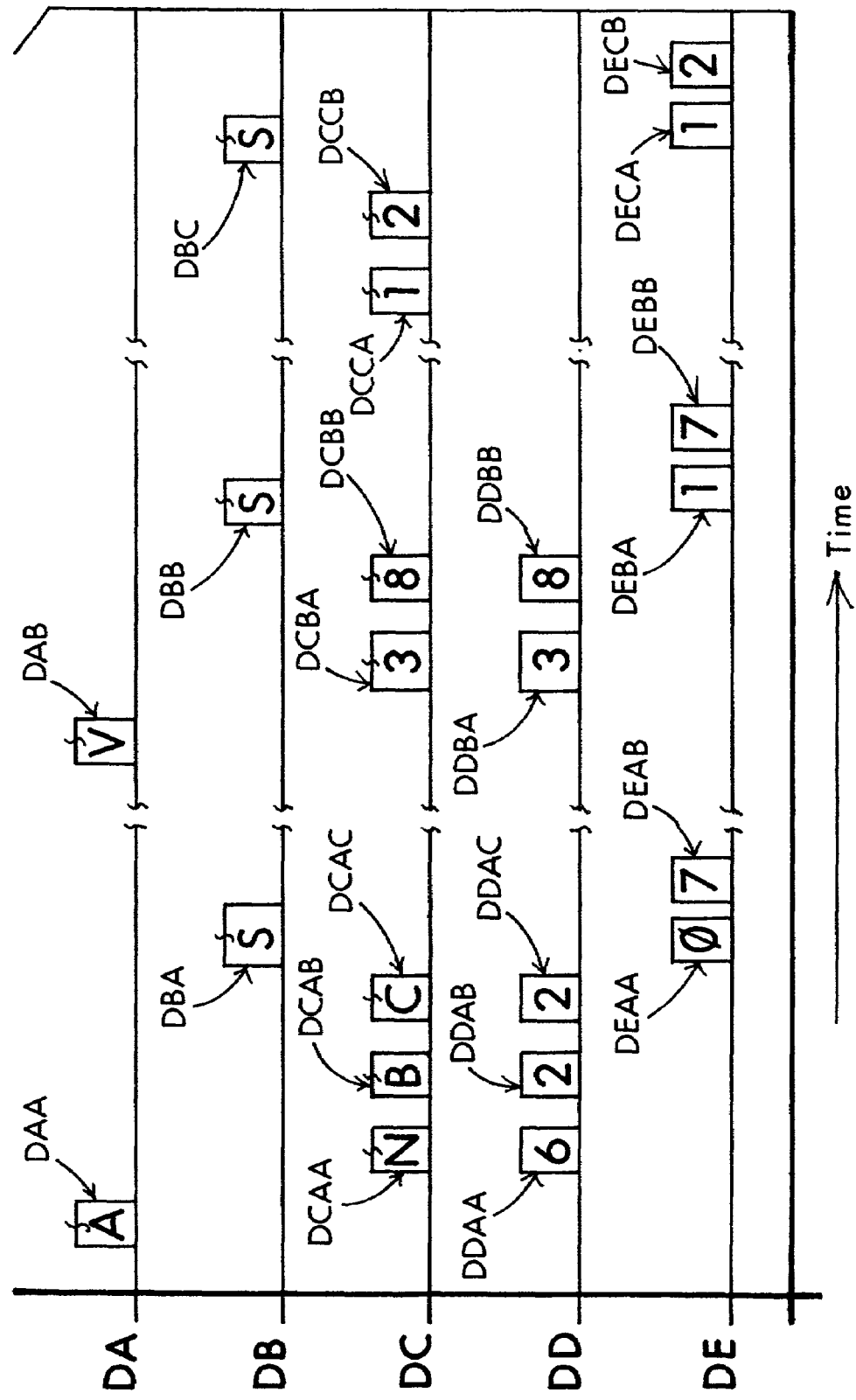
FIG. 12—An event diagram associable with FIGS. 10A and 10B depicting an acronymical or virtual keypad entry bracketed by a prefixal mode key entry and a postfixal SEND key entry.

FIG. 12 also depicts three modes of operation. The first, or acronymical mode is reached by first actuating the "A" keybutton 40-1 of FIG. 1 to deliver a signal DAA on line DA of FIG. 12. Subsequently, the acronymical characters such as NBC are entered DCAA, DCAB, DCAC on line DC. The concurrent mesne values DDAA, DDAB, DDAC deliver the acronym-equivalent copula signal 622 on line DD. Entering a SEND keybutton 44 instruction DBA initiates conversion of the copula value into the absolute channel number 07, shown as integers DEAA, DEAB on line DE.

The virtual mode is obtained by initially entering the "V" keybutton 40-2 command to deliver the signal DAB. Next, the integer values representing the virtual channel number, such as "38" are entered DCBA, DCBB on line DC. The virtual channel number integer entries are completed with the SEND keybutton 44 entry DBB, thereby initiating conversion of the virtual integer values, treated intermediately as copula values DDBA, DDBB, into counterpart absolute channel selection values DEBA, DEBB and in this example representing an absolute channel "17" selection.

Real mode entries may be obtained by directly entering the desired channel number, such as channel 12 shown by the entries DCCA, DCCB on line DC. No prefixal mode selection entry is shown on line DA, but a SEND entry DBC appears on line DB subsequent to the integer entries. As a result, the real integer entries DCCA, DCCB are immediately adapted into the absolute channel selection value "12", shown as command values DECA, DECB on line DE. The distinctive postfixal entry of the SEND entry DBC permits the integer entries to be extended beyond merely the shown two, for example allowing entry of "232+SEND" for the "Ovation" network in certain AT&T-Broadband™ service areas.

Figure 13:
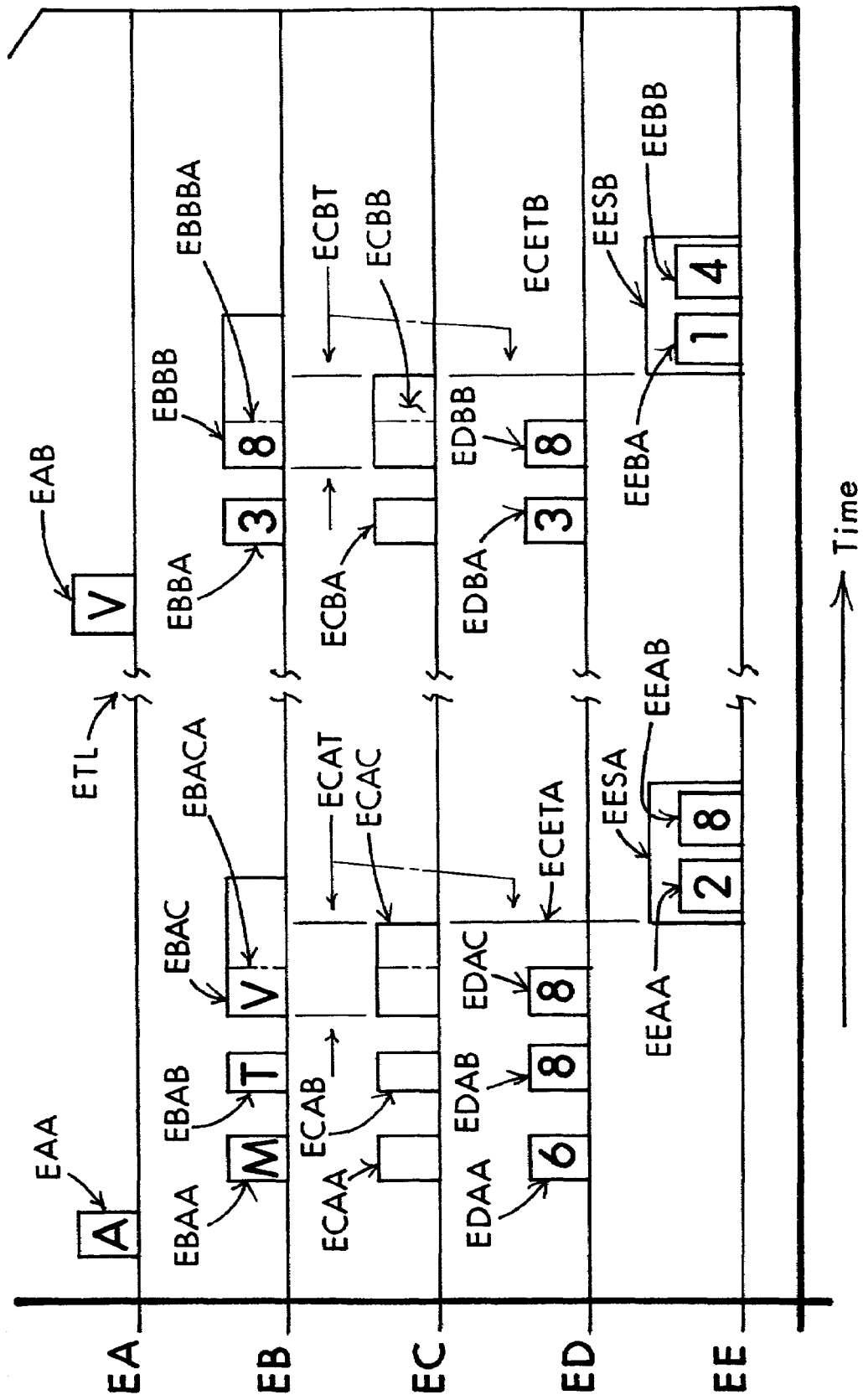
FIG. 13—An event diagram showing the SEND function satisfied by maintaining the last keybutton entry of a string of entries to exceed a predetermined time interval.

An acronymical character string entry EBAA, EBAB, EBAC may be preceded by an acronym mode "A" command entry EAA in the event diagram of FIG. 13. For example, the character string entry on line EB may include the MTV network acronym. Concurrent with each entry a timer is initiated, as shown on line EC. For example, when the first and second acronym characters EBAA, EBAB are entered, the time intervals ECAA, ECAB run concurrently. The time intervals are simultaneously and abruptly terminated when the character entries end, coinciding with the entry's trailing edge. Find also that the entries EBAA, EBAB may be of indefinite duration and the interval between entries may vary substantially and both variations being typical of a manual keypad entry sequence.

The last character entry EBAC is sustained active (keybutton kept actuated) for a longer period than the usual time EBAD of the preceding entries. The time interval ECAC runs naturally concurrent with the onset and initial portion of the character entry EBAC and continues for a predetermined period ECAT. Note however that the time duration ECAT is short of the maintained overall time duration of the character entry EBAC. Ordinarily this time duration ECAT may be a few seconds. Realize that the period ECAT may be more specifically engineered to best suit an anticipated application.

Each of the character string entries EBAA, EBAB, EBAC deliver corresponding copula values, usually to a register and depicted as an integer string EDAA, EDAB, EDAC having a mesne value of 688 as derived from the keypad entry activity.

Looking now as to the broken line ECETA it is apparent that the timeout of the interval ECAT initiates a virtual send window EESA, which includes the two absolute channel number values 28 shown as integers EEAA, EEAB which are sent to the remotely controlled television receiver or other device.

In a similar manner, a virtual mode entry may be submitted EAB followed by a real channel number 38 submitted as keypress entries EBAA, EBBB noting that the second keypress entry EBBB exceeds the usual entry duration EBBC. Concurrent with each entry, a timer interval; ECBA, ECBB is initiated commencing with each keypress entry. Find that the second sustained keypress entry EBBB exceeds the timer duration ECBT, thereby defining ECETB the onset of the virtual send window EESB to include the two absolute channel number 14 integers EEBA, EEBB as derived from the copula values EDBA, EDBB illustrated as a mesne value 38.

A principal advantage of the functional benefits afforded by FIG. 13 is that the mode key 40-1 or 40-2 needs to be pressed only once before making the character or integer string entries. To generate a send command, the last entry is merely held in a maintained state longer than usual for the preceding entries. Typically, this last entry may assume a duration of a few seconds to automatically establish a virtual determination of the send command.

Practice Caveats

In its primary expression, this invention enables a user to variously enter acronymical characters or REAL channel number selections and VIRTUAL channel number selections through the same keypad integer keys on a remote controller.

The utter essence of the invention to substantially increase the functional capacity of a remote controller with a minimal apparent increase in keypad complexity.

To achieve this novel teaching, a number of variant methods and device implementations are discussed which are suitable for practicing the invention. This tutelage urges an intuitive entry of a REAL channel number, a well known network acronym or a VIRTUAL channel number selection with little or no increase in keypad layout density and complexity.

It is necessary to realize that the numerous approaches which are now described as illustrative are intended to respond to hardware implementations and styling objectives of a wide base of contemporaneous remote controller designs. Realize that the described approaches might be embodied to take other modified forms which can be engineered by others to best satisfy a particular application embodiment or take advantage of different technological parts, operational protocols or implementation techniques without departing from the underlying spirit of the invention. In particular it is well known that the rapid state of art advancement may introduce other channel selection protocols and standards which can be adapted to this invention's fundamental teachings without a deviation from the overall essence of my invention. It is anticipated this improvement wrought by mere technology advancement and refinement are obvious improvement and therefore merely the natural result of good engineering practices. Utilization of this invention in apparatus and system upgrades is an important point to ponder, in view of the rapid ongoing advancements in software scripting and solid-state technology. It is further anticipated that the invention offers remarkable advantages of overall operational simplicity and enhanced user convenience in many categories of remotely controlled apparatus and particularly in television signal receiving systems for selection of various combinations of over-the-air, cable and satellite provided television station channel assignments exemplified by various real and virtual channel numbers and network acronyms as manually urged keypad entries.

What I claim for my invention is:

1. A keypad entry conversional method enabling a user of a portable remote controller to send a wireless channel number selection command to a remotely controlled television signal receiver in response to a manual entry of an acronym representing a desired programming content provider, comprising steps of:

manually submitting the acronym characters as a series of individual keypad entries;

temporarily storing a sequence of copula values representing the individual keypad entries;

converting the combined value of the stored sequence of copula values into an absolute channel number value;

manually effectuating a SEND command timely subsequent to completing the acronym entry sequence; and, recognizing the SEND command to enable a sending of the absolute channel number to the television signal receiver.

2. The keypad entry conversional method of claim 1 wherein the manual effectuation of the SEND command is determined by a manual actuation of a dedicated SEND keybutton.

3. The keypad entry conversional method of claim 1 wherein the manual effectuation of the SEND command is automatically determined by maintaining a manual actuation of a keybutton representing a final acronym character for a period of time exceeding a preestablished interval.

4. The keypad entry conversional method of claim 1 including further steps of:

defining the keypad arrangement to include a correspondent plurality of co-assigned alphabetical and decimal integer keybuttons; and, selecting a first mode for urging entry of a string of keybutton values constituting the acronym characters represented as a temporarily storable sequence of copula values.

5. The keypad entry conversional method of claim 4 including a further step of:

selecting a second mode for urging entry of a string of keybutton values constituting a real channel selection number entry represented as a temporarily storable sequence of copula values.

6. The keypad entry conversional method of claim 1 wherein the keypad entry comprises an alphabetical character string such as NBC intermediately recognized as a copula value such as 622 and therefrom converted into an absolute channel number such as 7 to subsequently be sent as the wireless channel number selection command upon the manual entry of the SEND command.

7. The entry conversional method of claim 1 wherein the portable remote controller may presuppose:

an universal configuration including a programmable memory provision which may be variously preset to enable at least one of a user entered acronym and a user entered set of decimal numbers which are temporarily stored as a set of copula values; and, upon a subsequent manual entry of the SEND command the stored copula values are converted into the absolute channel number value and sent as a wireless channel selection command to the television signal receiver.

8. The keypad entry conversional method of claim 1 wherein the portable remote controller may presuppose:

first urging manual entry of a plurality of acronym characters;

temporarily storing the copula value associated with the acronym characters;

second urging manual entry of a SEND command subsequent to a final entry of a last one of the acronym characters;

first utilizing the SEND command to enable a determination of the absolute channel number associated with the stored copula value; and, second utilizing the SEND command to translate the absolute channel number value as a wireless command signal sent to the television signal receiver.

9. A remote control method for converting a succession of manually urged keypad entries representing acronymic characters into an absolute channel number value for subsequent sending to a remotely controlled television signal receiver as a channel number selection command, including steps of:

submitting the keypad entries as a sequence of separate manual keybutton entries representing each of the individual characters composing the acronym;

temporarily storing an acronymic value associated with each manual keybutton entry;

entering a manual SEND command subsequent the manual keybutton entry of a terminal acronymic character;

translating the stored acronymic value into the absolute channel number value; and, sending the absolute channel number value to the television signal receiver in response to the manual entry of the SEND command, thereby establishing an immediate television channel selection corresponding with the acronym.

10. The remote control method of claim 9 further converting the keypad entry of a string of integer values representing a virtual channel number into the absolute channel number precedent to the subsequential sending as the wireless channel number selection command.

11. The remote control method of claim 9 further sharing the keypad entries to represent the acronymical, virtual channel number and real channel number entries by utilizing a common set of at least several keybuttons combining integer and alphabetical character value associations and preferably comprising combinations of:

| | | | |
|---|---|---|---|
| 2,A,B,C; | 3,D,E,F; | 4,G,H,I; | 5,J,K,L; |
| 6,M,N,O; | 7,P,R,S; | 8,T,U,V; | 9,W,X,Y; | and including functionally equivalent combinations.

12. The entry conversional method of claim 9 wherein the keypad entry such a an alphabetical character string such as HBO is intermediately recognized as a copula value such as an integer string value 426 and therefrom converted into an absolute channel number such as 6 and the subsequent manual entry of the SEND command effectuates the sending of the wireless absolute channel number selection command.

13. The entry conversional method of claim 12 wherein the copula value uniquely addresses a memory location and a mode definer entry enables a read-out of the true channel number as data stored in the uniquely addressed said memory location; and, presetting the memory location to hold data representing an available channel uniquely available in any one of a plurality of service areas.

14. A portable remote controller apparatus converting at least one of an acronymical keypad entry and a virtual channel number entry into an absolute channel number to modulate a channel selection command; comprising:

a keypad means;

the keypad means including an array of manual keybuttons co-assigned for interchangeably accepting a succession of integer value and alphabetical character entries;

a temporary storing means for retaining the value of the successive entries;

a SEND keybutton means for accepting a manual entry of a SEND command subsequent to a conclusion of the keybutton value entries;

a first processing means enabled by the SEND command to convert the stored values into the absolute channel number value; and, a sender means enabled by the SEND command to establish a wireless coupling of the absolute channel number value to a remotely controlled channel selection apparatus.

15. The portable remote controller apparatus of claim 14 further comprising a second processing means enabled by the SEND command to convert virtual channel number data submitted as the integer value entries into the absolute channel number value.

16. The portable remote controller apparatus of claim 14 further comprising:

an addressable memory means;

a presetting means for entering absolute channel selection data into a specific memory data storage location;

a memory addressing means adapting the submitted acronymical data into a memory address pointing to the specific memory data storage location; and, a memory readout means ordinarily enabled by the SEND command for retrieving the absolute channel number value represented by the channel selection data stored at the specific memory data storage location.

17. The remote controller apparatus of claim 15 further comprising: an addressable memory means;

a presetting means for entering absolute channel number data into a specific memory data storage location;

a memory addressing means adapting the submitted integer value into a memory address pointing to a specific data storage location; and, a memory readout means ordinarily enabled by the SEND command for retrieving the true channel number value stored at the specific memory data storage address location.

18. The remote controller apparatus of claim 14 further comprising:

a send initiation means including at least one of:

a manually actuatable SEND keybutton means;

a time dependent detector means for sensing an actuation of a co-assigned keybutton maintained beyond a predetermined period of time; and, a send function means coupled with at least one of the SEND keybutton means and the time dependent detector means for determining an enablement of the sender means.

19. The processing means of claim 17 further comprising:

a register means for temporarily storing a plurality of the alphabetical character entries as copula data values;

a register readout means for accessing readout of the temporarily stored copula data value entries;

a memory controller enabled by the SEND command; and, a memory means addressed by the copula data value and providing readout of a corresponding absolute channel number value.

20. The remote controller apparatus of claim 14 further comprising:

a device code library storage means; and, an encoder means coupled with the device code library storage means and interceding between the first processing means and the sender means to effectuate an unique signal encryption of the wireless coupling of the absolute channel number value to a compatible said remotely controlled channel selection apparatus.

* * * * *